United States Patent
Obana et al.

(10) Patent No.: US 7,933,905 B2
(45) Date of Patent: Apr. 26, 2011

(54) UNIVERSAL-HASH-FUNCTION-FAMILY CALCULATION UNIT AND SHARED-KEY GENERATION SYSTEM

(75) Inventors: Satoshi Obana, Tokyo (JP); Akihiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 623 days.

(21) Appl. No.: 12/067,618

(22) PCT Filed: Sep. 7, 2006

(86) PCT No.: PCT/JP2006/317780
§ 371 (c)(1),
(2), (4) Date: Mar. 20, 2008

(87) PCT Pub. No.: WO2007/034685
PCT Pub. Date: Mar. 29, 2007

(65) Prior Publication Data
US 2009/0240913 A1  Sep. 24, 2009

(30) Foreign Application Priority Data

Sep. 20, 2005 (JP) .................................. 2005-272090

(51) Int. Cl.
G06F 17/30 (2006.01)
H04L 9/28 (2006.01)

(52) U.S. Cl. ............. 707/747; 380/28; 380/44; 711/216
(58) Field of Classification Search ....................... None
See application file for complete search history.

(56) References Cited

U.S. PATENT DOCUMENTS

| | | | |
|---|---|---|---|
| 7,174,013 B1 * | 2/2007 | Patel et al. ...................... | 380/28 |
| 7,321,659 B2 * | 1/2008 | Hall et al. ........................ | 380/37 |
| 7,577,250 B2 * | 8/2009 | Damgaard et al. .............. | 380/44 |
| 2007/0081668 A1 * | 4/2007 | McGrew et al. ................ | 380/37 |

* cited by examiner

*Primary Examiner* — Gary J Portka
(74) *Attorney, Agent, or Firm* — Scully, Scott, Murphy & Presser, PC

(57) ABSTRACT

An input data enlarging unit (100) derives a first enlargement unit output and a second enlargement unit output that are uniquely specified by input data (103) to output the same. The first enlargement unit output and the second enlargement unit output are elements of output data set B which forms a group. An $\epsilon$-$\Delta$ hash function calculation unit (101) receives as input the first enlargement unit output to calculate an h$\Delta$ function which is specified by hash-function-specifying data (104) and an element of the H$\Delta$ function set. The function set H$\Delta$ is such that the number of h$\in$H $\Delta$ which satisfies $h(x)-h(y)=d$ for an arbitrary element d of the output data set B and two different elements x and y of the output data set B is equal to or smaller than $|H\Delta|\cdot\epsilon$. An adding unit (102) adds together the result of calculation of the function H$\Delta$ and the second enlargement unit output to output a result of the addition.

6 Claims, 7 Drawing Sheets

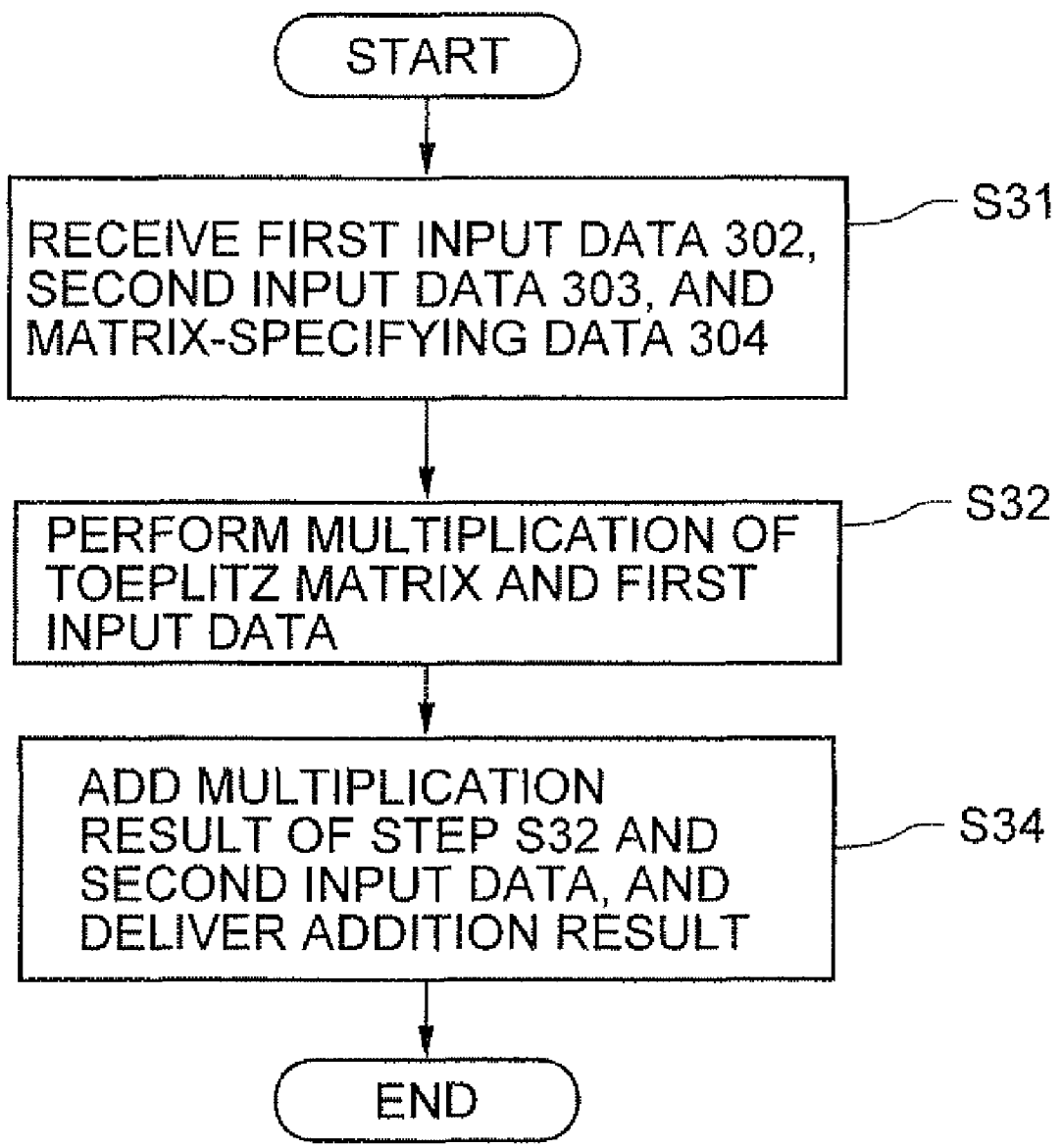

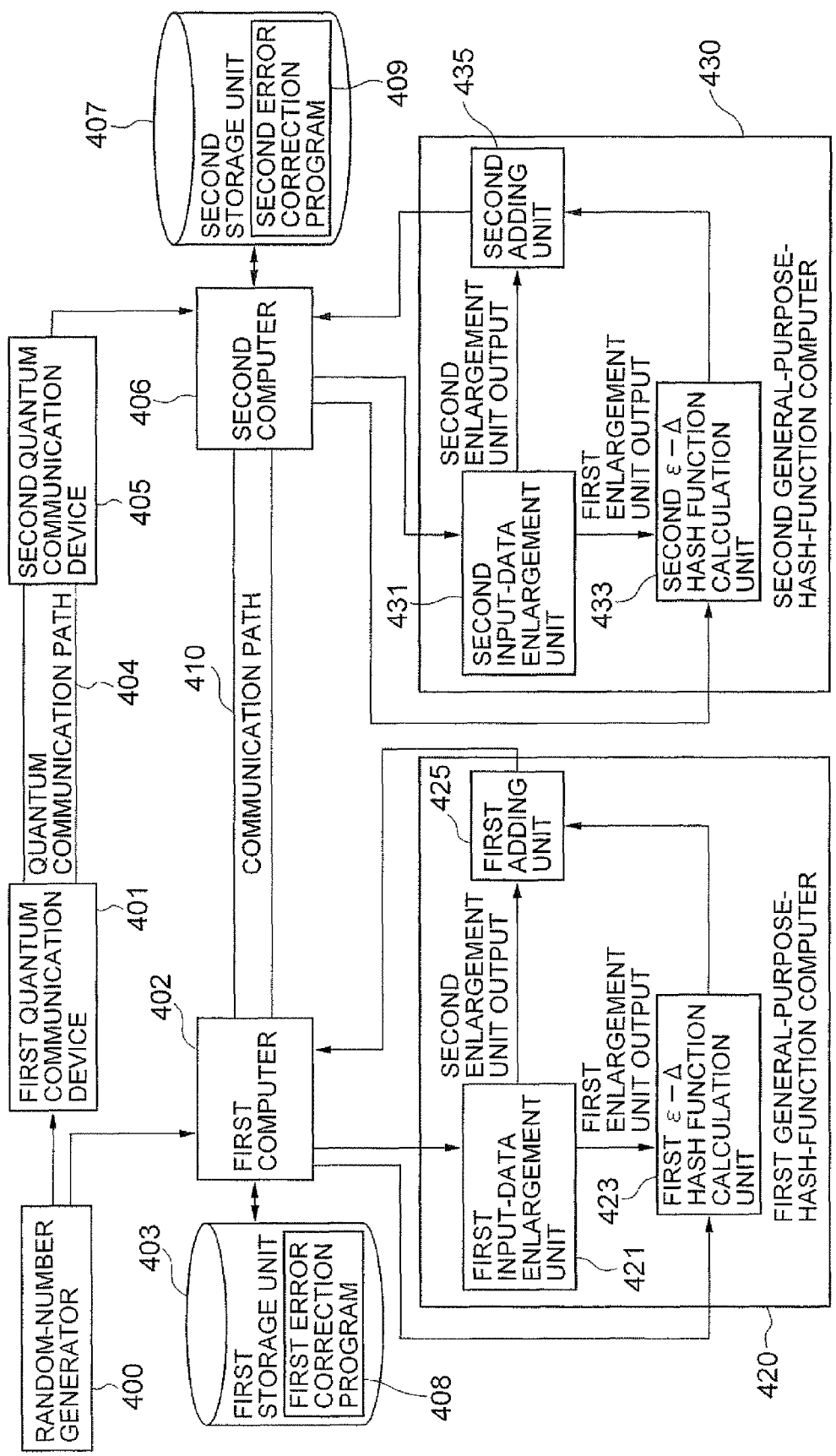

UNIVERSAL-HASH-FUNCTION-FAMILY CALCULATION UNIT AND SHARED-KEY GENERATION SYSTEM

TECHNICAL FIELD

The present invention relates to a universal-hash-function-family calculation unit and a shared-key generation system, and more particularly, to a universal-hash-function-family calculation unit having a reduced number of elements of hash function family and a shared-key generation system using the universal-hash-function-family calculation unit. The present invention further relates to a calculating method and a program used in the universal-hash-function-family calculation unit.

BACKGROUND ART

An $\epsilon$-universal-hash-function family from a set A to a set B represents a set of functions from set A to set B where the number of elements h of H which is a set of functions and which satisfies $h(x)=h(y)$ with respect to given two different arbitrary elements x, y belonging to the set A is equal to or less than $\epsilon \times |H|$. $|H|$ is the number of elements of the set H. Hereinafter, the number of elements of an arbitrary set S is represented by $|S|$. The $\epsilon$-universal-hash-function family is used for improvement of secrecy in a message authentication code or quantum key distribution, as described in C. H. Bennett, G. Brassard, C. Crepeau, and U. Maurer "Generalized Privacy Amplification", IEEE Trans. Information Theory vol. 41, no. 6, 1995, pp. 1915-1923 (Non-Patent Document 1) and D. R. Stinson, "Universal Hashing and Authentication Codes", Designs, Codes and Cryptography, vol. 4, 1994, pp. 369-380 (Non-Patent Document 2).

A method for realizing a conventional $\epsilon$-universal-hash-function family is described in Non-Patent Document 2 and D. R. Stinson, "Combinatorial techniques for Universal Hashing", Journal of Computer and System Sciences, vol. 48, No. 2, 1994, pp. 337-346 (Non-Patent Document 3). Further, Non-Patent Documents 2 and 3 describe the lower bound of the number of elements of $\epsilon$-universal-hash-function family. When the $\epsilon$-universal-hash-function family is used in a message authentication code or quantum key distribution, it is desirable that the number of elements of the $\epsilon$-universal-hash-function family used be small in the view point of efficiency. However, the conventional technique can only achieve the lower bound of the number of elements with respect to only extremely-limited parameters. Known techniques for constructing the $\epsilon$-universal-hash-function family for an input set A and an output set B where the lower bound cannot be achieved include, as described in Non-Patent Document 1, a method including the steps of: selecting an element k from the set A; calculating a product between the element k and the input data x; and applying a reduction conversion of the set A to set B. In this case, although the value of $\epsilon$ is $1/|B|$, which means that the number of elements of the $\epsilon$-universal-hash-function family is equal to the number of elements of the set A, $|A|/|B|$ which is the lower bound of the number of elements described in Patent Document 3 is not achieved. Further, although Martin Boesgaard, Thomas Christensen and Erik Zenner, "Badger—A Fast and Provably Secure MAC", Proceedings of Applied Cryptography and Network Security, ACNS2005, Lecture Notes in Computer Science, vol. 3531, Springer Verlag, 2005, pp. 176-191 (Non-Patent Document 4) describes a method for constructing the $\epsilon$-universal-hash-function family, the method described therein is a general method for constructing a hash function aiming to increase in the calculation speed of a hash function, and thus not aiming to a reduction of the number of elements of a hash function set.

Further, a method (method for achieving the lower bound of the number of elements of the $\epsilon$-universal-hash-function family) has scarcely been known which is applied in the case where the number of elements of the set B, which is the output set, is large, even though there has been available a useful technique such as a quantum key distribution.

An error correction method referred to as "cascade" is described in G. Brassard, L. Salvail, "Secret-Key Reconciliation by Public Discussion", Proc. Eurocrypto '93, Lecture Notes in Computer Science, Vol. 765, Springer Verlag, 1994, pp. 410-423 (Non-Patent Document 5).

Further, a system that cuts out some bits of input data and performs hash calculation on the cut out data is described in Patent Publication JP-2001-134178A (paragraph [0018], FIG. 4).

As described above, in the $\epsilon$-universal-hash-function family realized by the conventional techniques, the input set and output set where the number of elements is minimized are limited. However, it is desirable to perform calculation of a hash function belonging to the $\epsilon$-universal-hash-function family having a reduced number of elements.

DISCLOSURE OF THE INVENTION

An object of the present invention is therefore to provide a universal-hash-function-family calculation unit, a universal-hash-function-family calculating method, and a universal-hash-function-family calculation program which are capable of realizing an $\epsilon$-universal-hash-function family having a reduced number of elements. Another object of the present invention is to provide a shared-key generation system capable of generating a shared key which is shared between a transmitting side and a receiving side in a communication system using the $\epsilon$-universal-hash-function family having a reduced number of elements.

The present invention provides, in a first aspect thereof, a universal-hash-function-family calculation unit that performs calculation using input data and delivers output data, including: input data enlarging means for receiving the input data and deriving, from the input data through one-to-one mapping, two elements of an output data set which is a set of the output data; $\Delta$-hash-function calculating means for receiving hash-function-specifying data that uniquely specifies a hash function from a hash function set, the hash function being an element of the hash function set, to calculate a hash value of the hash function specified by the hash-function-specifying data by using, as an input, one of the two elements of the output data set derived by the input data enlarging means; and adding means for adding together the hash value calculated by the $\Delta$-hash-function calculating means and the other of the two elements of the output data set derived by the input data enlarging means, to output a result of the addition as output data, wherein: the $\Delta$-hash-function calculating means calculates the hash value of a hash function belonging to a hash function set and specified by the hash-function-specifying data, the hash function set satisfying a condition that a number of elements h of the hash function set satisfying $h(x)-h(y)=d$ is equal to or smaller than a value obtained by multiplying a number of hash functions, which are elements of the hash function set, by a predetermined value, given x and y being two different elements belonging to a codomain set of the hash function set, given d being an arbitrary element belonging to a codomain set of the hash function set.

The configuration may be such that the output data set is a set of m-bit data; the input data is n-bit data; the hash-function-specifying data is m-bit data; a relationship $n \leq 2 \cdot m$ is established between the n and the m; the input data enlarging means derives, as the two elements of the output data set, higher m bits of the input data and lower m bits of the input data; and the Δ-hash-function calculating means performs multiplication of one of the two elements of the output data set derived by the input data enlarging means and the hash-function-specifying data of m bits on a Galois field GF(2m), to obtain a result of the multiplication as the hash value.

The configuration may be such that the output data set is a set of nm-bit data; the input data is n-bit data; the hash-function-specifying data is m-bit data; a relationship $n \leq 2 \cdot m$ is established between the n and the m; the input data enlarging means derives, as the two elements of the output data set, higher m bits of the input data and m-bit data obtained by connecting a bit train including 2·m−n bits of "0"s to a bit train from an (m+1)-th bit to an n-th bit as counted from a most significant bit of the input data; and the Δ-hash-function calculating means performs multiplication of one of the two elements of the output data set derived by the input data enlarging means and the hash-function-specifying data of m-bit on a Galois field GF(2m), to obtain a result of the multiplication as the hash value.

The present invention provides, in a second aspect thereof, a universal-hash-function-family calculation unit that performs calculation of a hash function belonging to an ε-universal-hash-function family, including: multiplying means for receiving, as first input data, an element belonging to a first set which is a field where addition and multiplication can be defined, and an element belonging to the first set as the hash-function-specifying data, to perform multiplication of the first input data and hash-function-specifying data; data converting means for performing an onto-mapping which satisfies a linearity to convert a result of the multiplication by the multiplication means into an element of a second set which is a set of the output data of the universal-hash-function-family calculation unit; and adding means for receiving an element belonging to the second set as second input data, and adding together the element of the second set obtained by converting the result of the multiplication by the data converting means and the second input data, to output a result of the addition as the output data of the universal-hash-function-family calculation unit.

The configuration may be such that the second set configures a group; and the adding means adds together an element of the second set obtained by converting the result of the multiplication by the data converting means and the second input data on the second set.

The present invention provides, in a third aspect thereof, a universal-hash-function-family calculation unit that delivers as output data a vector on a set where scalar multiplication and addition can be defined, including: Toeplitz-matrix calculating means for receiving a vector on the set as first input data and matrix-specifying data that uniquely specifies a Toeplitz matrix, and performing calculation using a Toeplitz matrix specified by the matrix-specifying data and first input data, to derive a vector having a number of elements which is equal to a number of the output data; and adding means for receiving, as second input data, a vector on the set having a number of elements which is equal to the number of the output data, and adding together the vector derived by the Toeplitz-matrix calculating means and the second input data, to output a result of the addition as the output data.

The configuration may be such that the matrix-specifying data is data uniquely specifying an m-row/n-column Toeplitz matrix; the first input data is an n-dimensional vector on a set where scalar multiplication and addition can be defined; the second input data is an m-dimensional vector on the set; the Toeplitz-matrix calculating means performs multiplication of the m-row/n-column Toeplitz matrix specified by the matrix-specifying data and the first input data which is an n-dimensional vector, to derive an m-dimensional vector; and the adding means adds the m-dimensional vector derived by the Toeplitz-matrix calculating means and second input data.

The configuration may be such that the matrix-specifying data is data uniquely specifying an m-row/n-column Toeplitz matrix; the first input data is an n-dimensional vector on a set where scalar multiplication and addition can be defined; the second input data is an m-dimensional vector on the set; the Toeplitz-matrix calculating means applies an elementary row transformation to the m-row/n-column Toeplitz matrix specified by the matrix-specifying data and performs multiplication of the m-row/n-column matrix after the elementary transformation and the first input data, to derive an m-dimensional vector; and the adding unit adds together the m-dimensional vector derived by the Toeplitz-matrix calculating means and the second input data.

The configuration may be such that the matrix-specifying data is data uniquely specifying an m-row/n-column Toeplitz matrix; the first input data is an n-dimensional vector on a set where scalar multiplication and addition can be defined; the second input data is an m-dimensional vector on the set; the Toeplitz-matrix calculating means applies an elementary column transformation to the m-row/n-column Toeplitz matrix specified by the matrix-specifying data and performs multiplication of the m-row/n-column matrix after the elementary transformation and the first input data, to derive an m-dimensional vector; and the adding unit adds the m-dimensional vector derived by the Toeplitz-matrix calculating means and second input data.

The configuration may be such that the Toeplitz-matrix calculating means receives one or both of numbers of rows and columns of the Toeplitz matrix, a vector configured by elements in number equal to the number of columns of the Toeplitz matrix as the first input data, and a vector configured by elements m number equal to the number obtained by subtracting 1 from a sum of the numbers of rows and columns of the Toeplitz matrix as the matrix-specifying data; the Toeplitz-matrix calculating means specifies, using the received one or both of the numbers of rows and columns of the Toeplitz matrix and matrix-specifying data, a first row and a first column of the Toeplitz matrix, to determine the Toeplitz matrix and performs multiplication of the Toeplitz matrix and the first input data; and the adding means receives, as the second input data, a vector configured by elements in number equal to the number of rows of the Toeplitz matrix and adds together the result of the multiplication of the Toeplitz-matrix calculating means and the second input data.

The configuration may be such that the Toeplitz-matrix calculating means receives one or both of the numbers of rows and columns of the Toeplitz matrix, a vector configured by elements in number equal to the number of columns of the Toeplitz matrix as the first input data, and a vector configured by elements in number equal to the number obtained by subtracting 1 from a sum of the numbers of rows and columns of the Toeplitz matrix as the matrix-specifying data; the Toeplitz-matrix calculating means specifies, using the received one or both of the numbers of rows and columns of the Toeplitz matrix and matrix-specifying data, the first row and first column of the Toeplitz matrix to determine the Toeplitz matrix, applies an elementary row transformation to the Toeplitz matrix, and performs multiplication of the matrix after the elementary transformation and the first input data; and the adding means receives, as the second input data, a vector configured by elements in number equal to the number of rows of the Toeplitz matrix and adds the result of the multiplication of the Toeplitz-matrix calculating means and second input data.

The configuration may be such that the Toeplitz-matrix calculating means receives one or both of the numbers of rows and columns of the Toeplitz matrix, a vector configured by elements in number equal to the number of columns of the Toeplitz matrix as the first input data, and a vector configured by elements in number equal to the number obtained by subtracting 1 from a sum of the numbers of rows and columns of the Toeplitz matrix as the matrix-specifying data; the Toeplitz-matrix calculating means specifies, using the received one or both of the numbers of rows and columns of the Toeplitz matrix and matrix-specifying data, the first row and first column of the Toeplitz matrix to determine the Toeplitz matrix, applies an elementary column transformation to the Toeplitz matrix, and performs multiplication of the matrix after the elementary transformation and first input data; and the adding means receives, as the second input data, a vector configured by elements in number equal to the number of rows of the Toeplitz matrix and adds together the result of the multiplication of the Toeplitz-matrix calculating means and the second input data.

The present invention provides, in a fourth aspect thereof, a shared-key generation system that includes the universal-hash-function-family calculation units according to the first aspect each in a transmitting device and in a receiving device and generates a shared key shared between the transmitting device and the receiving device, said system including: random-number generating means for generating random-number data; transmitting side storage means for storing first random-number data generated by the random-number generating means; first quantum communication means for transmitting the first random-number data through a quantum communication path; second quantum communication means for receiving the first random-number data from the first quantum communication means through the quantum communication path; receiving side storage means for storing the first random-number data that the second quantum communication means has received; transmitting side and receiving side error correction means for generating shared data shared between the transmitting device and the receiving device, the transmitting side error correction means performing an error correction processing based on the first random-number data stored in the transmitting side storage means, the receiving side error correction means performing error correction processing based on the first random-number data stored in the receiving side storage means; transmitting-side input means for inputting the shared data generated by the transmitting side error correction means to input data enlarging means of the transmitting side universal-hash-function-family calculation unit and inputting, as hash-function-specifying data, second random number generated by the random-number generating means to Δ-hash-function calculating means of the transmitting side universal-hash-function-family calculation unit; second random-number data transmitting means for transmitting the second random-number data generated by the random-number generating means through a communication path; second random-number-data receiving means for receiving the second random-number data from the second random-number data transmitting means through a communication path; and receiving-side input means for inputting the shared data generated by the receiving side error correction means to the input data enlarging means of the receiving side universal-hash-function-family calculation unit and inputting, as the hash-function-specifying data, the second random-number data that the second random-number-data receiving means has received to Δ-hash-function calculating means of the receiving side universal-hash-function-family calculation unit, wherein: the transmitting side universal-hash-function-family calculation means delivers, as the shared key, output data corresponding to the data input by the transmitting-side input means, and the receiving side universal-hash-function-family calculation means delivers, as the shared key, output data corresponding to the data input by the receiving-side input means.

The present invention provides, in a fifth aspect thereof, a universal-hash-function-family calculating method that performs calculation using input data and delivers output data, including the steps of: input-data enlarging means receiving the input data; Δ-hash-function calculation means receiving hash-function-specifying data that uniquely specifies a hash function from a hash function set, the hash function being an element of the hash function set; the input-data enlarging means deriving, from the input data through a one-to-one mapping, two elements of an output data set which is a set of the output data, to enlarge the input data; the Δ-hash-function calculation means calculating a hash value of the hash function specified by the hash-function-specifying data by using, as an input, one of the two elements of the output data set derived by the input data enlarging step; adding means adding together the hash value calculated by the hash function calculating step and the other of the two elements of the output data set derived by the input data enlarging step, to output a result of the addition as output data, wherein: the Δ-hash-function calculation means calculates the hash value of a hash function belonging to a hash function set and specified by the ash-function-specifying data, the hash function set satisfying a condition that a number of elements h of the hash function set satisfying $h(x)-h(y)=d$ is equal to or smaller than a value obtained by multiplying a number of hash functions, which are elements of the hash function set, by a predetermined value, given x and y being two different elements belonging to a codomain set of the hash function set, given d being an arbitrary element belonging to a codomain set of the hash function set.

The present invention provides, in a sixth aspect thereof, a universal-hash-function-family calculating method that performs calculation of a hash function belonging to an ε-universal-hash-function family, including the steps of: multiplication means receiving, as first input data, an element belonging to a first set which is a field where addition and multiplication can be defined and an element belonging to the first set as the hash-function-specifying data; adding means receiving an element belonging to a second set which is a set of output data of the universal-hash-function-family calculating method as second input data; the multiplication means performing multiplication of the first input data and hash-function-specifying data; data conversion means performing an onto-mapping which satisfies a linearity to convert a result of the multiplication of the multiplication step into an element of the second set; and adding means adding together the element of the second set obtained by converting the result of the multiplication by the data converting step and the second input data, to output a result of the addition as the output data of the universal-hash-function-family method.

The present invention provides, in a seventh aspect thereof, a universal-hash-function-family calculating method that delivers as output data a vector on a set where scalar multiplication and addition can be defined, including the steps of: Toeplitz-matrix calculation means receiving a vector on the set as first input data and matrix-specifying data that uniquely specifies a Toeplitz matrix; adding means receiving, as second input data, a vector on the set having a number of elements equal to the number of the output data; the adding means performing calculation using a Toeplitz matrix specified by the matrix-specifying data and first input data to derive a vector having a number of elements equal to the number of the output data; and the adding means adding together the vector derived by the matrix calculating step and the second input data, to output a result of the addition as the output data.

The present invention provides, in an eighth aspect thereof, a universal-hash-function-family calculation program on a computer that performs calculation using input data and delivers output data, the program allowing the computer to execute the processings of: receiving the input data; receiving hash-function-specifying data that uniquely specifies a hash function which is an element of a hash function set; deriving, from the input data through a one-to-one mapping, two elements of an output data set which is a set of the output data to enlarge the input data; calculating the hash value of a hash function belonging to a hash function set and specified by the hash-function-specifying data, the hash function set satisfying a condition that a number of elements h of the hash function set satisfying h(x)−h(y)=d is equal to or smaller than a value obtained by multiplying a number of hash functions, which are elements of the hash function set, by a predetermined value, given x and y being two different elements belonging to a codomain set of the hash function set, given d being an arbitrary element belonging to a codomain set of the hash function set; and adding together the hash value calculated by the Δ-hash-function calculating processing and the other of the two elements of the output data set derived by the input data enlarging processing, to output a result of the addition as output data.

The present invention provides, in a ninth aspect thereof, a universal-hash-function-family calculation program on a computer that performs calculation of a hash function belonging to an ϵ-universal-hash-function family, the program allowing the computer to execute the processings of: receiving, as first input data, an element belonging to a first set which is a field where addition and multiplication can be defined and an element belonging to the first set as the hash-function-specifying data; receiving an element belonging to a second set which is a set of output data of the computer as second input data; performing multiplication of the first input data and the hash-function-specifying data; performing an onto-mapping which satisfies a linearity to convert the result of the multiplication by the multiplication processing into an element of the second set; and adding together the element of the second set obtained by converting the result of the multiplication by the data converting processing and the second input data, to output a result of the addition as the output data of the computer.

The present invention provides, in a tenth aspect thereof a universal-hash-function-family calculation program on a computer that delivers as output data a vector on a set where scalar multiplication and addition can be defined, the program allowing the computer to execute the processings of: receiving a vector on the set as first input data and matrix-specifying data that uniquely specifies a Toeplitz matrix; receiving, as second input data, a vector on the set having a number of elements equal to the number of the output data; performing matrix calculation using a Toeplitz matrix specified by the matrix-specifying data and the first input data, to derive a vector having number of elements equal to the number of the output data; and adding together the vector derived by the matrix calculation and the second input data, to output a result of the addition as the output data.

The present invention provides, in an eleventh aspect thereof, a universal-hash-function-family calculating method that performs calculation using input data and delivers output data, including the steps of: receiving the input data; receiving hash-function-specifying data that uniquely specifies a hash function from a hash function set, the hash function being an element of the hash function set; deriving, from the input data through a one-to-one mapping, two elements of an output data set which is a set of the output data, to enlarge the input data; calculating a hash value of the hash function specified by the hash-function-specifying data by using, as an input, one of the two elements of the output data set derived by the input data enlarging step; adding together the hash value calculated by the hash function calculating step and the other of the two elements of the output data set derived by the input data enlarging step, to output a result of the addition as output data, wherein: the hash function calculating step calculates the hash value of a hash function belonging to a hash function set and specified by the ash-function-specifying data, the hash function set satisfying a condition that a number of elements h of the hash function set satisfying h(x)−h(y)=d is equal to or smaller than a value obtained by multiplying a number of hash functions, which are elements of the hash function set, by a predetermined value, given x and y being two different elements belonging to a codomain set of the hash function set, given d being an arbitrary element belonging to a codomain set of the hash function set.

The method may be such that the output data set is a set of m-bit data; the input data is n-bit data; the hash-function-specifying data is m-bit data; a relationship n≦2·m is established between the n and the m; the input data enlarging means derives, as the two elements of the output data set, higher m bits of the input data and lower m bits of the input data; and the Δ-hash-function calculating means performs multiplication of one of the two elements of the output data set derived by the input data enlarging means and the hash-function-specifying data of m bits on a Galois field GF(2m), to obtain a result of the multiplication as the hash value.

The method may be such that the output data set is a set of r-bit data; the input data is n-bit data; the hash-function-specifying data is m-bit data; a relationship n≦2·m is established between the n and the m; the input data enlarging means derives, as the two elements of the output data set, higher m bits of the input data and m-bit data obtained by connecting a bit train including 2·m−n bits of "0"s to a bit train from an (m+1)-th bit to an n-th bit as counted from a most significant bit of the input data; and the Δ-hash-function calculating means performs multiplication of one of the two elements of the output data set derived by the input data enlarging means and the hash-function-specifying data of m-bit on a Galois field GF(2m), to obtain a result of the multiplication as the hash value.

The present invention provides, in a twelfth aspect thereof, a universal-hash-function-family calculating method that delivers as output data a vector on a set where scalar multiplication and addition can be defined, including the steps of: receiving a vector on the set as first input data and matrix-specifying data that uniquely specifies a Toeplitz matrix; receiving, as second input data, a vector on the set having a number of elements equal to the number of the output data; performing calculation using a Toeplitz matrix specified by the matrix-specifying data and first input data to derive a vector having a number of elements equal to the number of the output data; and adding together the vector derived by the matrix calculating step and the second input data, to output a result of the addition as the output data.

The method may be such that the second set configures a group; and the adding step adds together an element of the second set obtained by converting the result of the multiplication by the data converting step and the second input data on the second set.

The present invention provides, in a thirteen aspect thereof, a universal-hash-function-family calculating method that performs calculation of a hash function belonging to an $\epsilon$-universal-hash-function family, including the steps of: receiving, as first input data, an element belonging to a first set which is a field where addition and multiplication can be defined and an element belonging to the first set as the hash-function-specifying data; receiving, an element belonging to a second set which is a set of output data of the universal-hash-function-family calculating method as second input data; performing multiplication of the first input data and hash-function-specifying data; performing an onto-mapping which satisfies a linearity to convert a result of the multiplication of the multiplication step into an element of the second set; and adding together the element of the second set obtained by converting the result of the multiplication by the data converting step and the second input data, to output a result of the addition as the output data of the universal-hash-function-family method.

The method may be such that the matrix-specifying data is data uniquely specifying an m-row/n-column Toeplitz matrix; the first input data is an n-dimensional vector on a set where scalar multiplication and addition can be defined; the second input data is an m-dimensional vector on the set; the Toeplitz-matrix calculating step performs multiplication of the m-row/n-column Toeplitz matrix specified by the matrix-specifying data and the first input data which is an n-dimensional vector, to derive an m-dimensional vector; and the adding step adds the m-dimensional vector derived by the Toeplitz-matrix calculating means and second input data.

The method may be such that the matrix-specifying data is data uniquely specifying an m-row/n-column Toeplitz matrix; the first input data is an n-dimensional vector on a set where scalar multiplication and addition can be defined; the second input data is an m-dimensional vector on the set; the Toeplitz-matrix calculating step applies an elementary row transformation to the m-row/n-column Toeplitz matrix specified by the matrix-specifying data and performs multiplication of the m-row/n-column matrix after the elementary transformation and the first input data, to derive an m-dimensional vector; and the adding step adds together the m-dimensional vector derived by the Toeplitz-matrix calculating step and the second input data.

The method may be such that the matrix-specifying data is data uniquely specifying an m-row/n-column Toeplitz matrix; the first input data is an n-dimensional vector on a set where scalar multiplication and addition can be defined; the second input data is an m-dimensional vector on the sot; the Toeplitz-matrix calculating step applies an elementary column transformation to the m-row/n-column Toeplitz matrix specified by the matrix-specifying data and performs multiplication of the m-row/n-column matrix after the elementary transformation and the first input data, to derive an m-dimensional vector; and the adding step adds the m-dimensional vector derived by the Toeplitz-matrix calculating means and second input data.

The method may be such that the specifying-data receiving step receives one or both of numbers of rows and columns of the Toeplitz matrix, a vector configured by elements in number equal to the number of columns of the Toeplitz matrix as the first input data, and a vector configured by elements in number equal to the number obtained by subtracting 1 from a sum of the numbers of rows and columns of the Toeplitz matrix as the matrix-specifying data; the second data receiving step receives, as the second input data, a vector configured by elements in number equal to the number of rows of the Toeplitz matrix; the matrix calculating step specifies, using the received one or both of the numbers of rows and columns of the Toeplitz matrix and matrix-specifying data, the first row and first column of the Toeplitz matrix to determine the Toeplitz matrix, applies an elementary row transformation to the Toeplitz matrix, and performs multiplication of the matrix after the elementary transformation and the first input data; and the adding step adds together the result of the multiplication of the Toeplitz-matrix calculating means and the second input data.

The method may be such that the specifying-data receiving step receives one or both of the numbers of rows and columns of the Toeplitz matrix, a vector configured by elements in number equal to the number of columns of the Toeplitz matrix as the first input data, and a vector configured by elements in number equal to the number obtained by subtracting 1 from a sum of the numbers of rows and columns of the Toeplitz matrix as the matrix-specifying data; the second data receiving step receives, as the second input data, a vector configured by elements in number equal to the number of rows of the Toeplitz matrix, the matrix calculating step specifies, using the received one or both of the numbers of rows and columns of the Toeplitz matrix and matrix-specifying data, the first row and first column of the Toeplitz matrix to determine the Toeplitz matrix, applies an elementary row transformation to the Toeplitz matrix, and performs multiplication of the matrix after the elementary transformation and the first input data; and the adding step adds the result of the multiplication of the Toeplitz-matrix calculating means and second input data.

The method may be such that the specifying-data receiving step receives one or both of the numbers of rows and columns of the Toeplitz matrix, a vector configured by elements in number equal to the number of columns of the Toeplitz matrix as the first input data, and a vector configured by elements in number equal to the number obtained by subtracting 1 from a sum of the numbers of rows and columns of the Toeplitz matrix as the matrix-specifying data; the second data receiving step receives, as second input data, a vector configured by elements in number equal to the number of rows of Toeplitz matrix; the matrix calculating step specifies, using the received one or both of the numbers of rows and columns of the Toeplitz matrix and matrix-specifying data, the first row and first column of the Toeplitz matrix to determine the Toeplitz matrix, applies an elementary column transformation to the Toeplitz matrix, and performs multiplication of the matrix after the elementary transformation and the first input data; and the adding step adds together the result of the multiplication of the Toeplitz-matrix calculating means and the second input data.

According to the present invention, it is possible to realize an $\epsilon$-universal-hash-function family having a reduced number of elements. Further, it is possible to generate a shared key shared between a transmitting side and a receiving side in a communication system while using the $\epsilon$-universal-hash-function family having a reduced number of elements.

BRIEF DESCRIPTION OF THE DRAWINGS

FIG. 6 is a flowchart showing an example of operation of the universal-hash-function-family calculation unit according to the third embodiment; and FIG. 7 is a block diagram showing an example or the configuration of a shared-key generation system.

BEST MODE FOR CARRYING OUT THE INVENTION

Now, embodiments of the present invention will be described with reference to the accompanying drawings. As described above, the number of elements of an arbitrary set S is represented by |S|. A universal-hash-function-family calculation unit according to the present invention realizes an $\epsilon$-universal-hash-function family. In other words, the universal-hash-function-family calculation unit according to the present invention performs calculation of a hash function belonging to the $\epsilon$-universal-hash-function family.

First Embodiment

Figure 1:
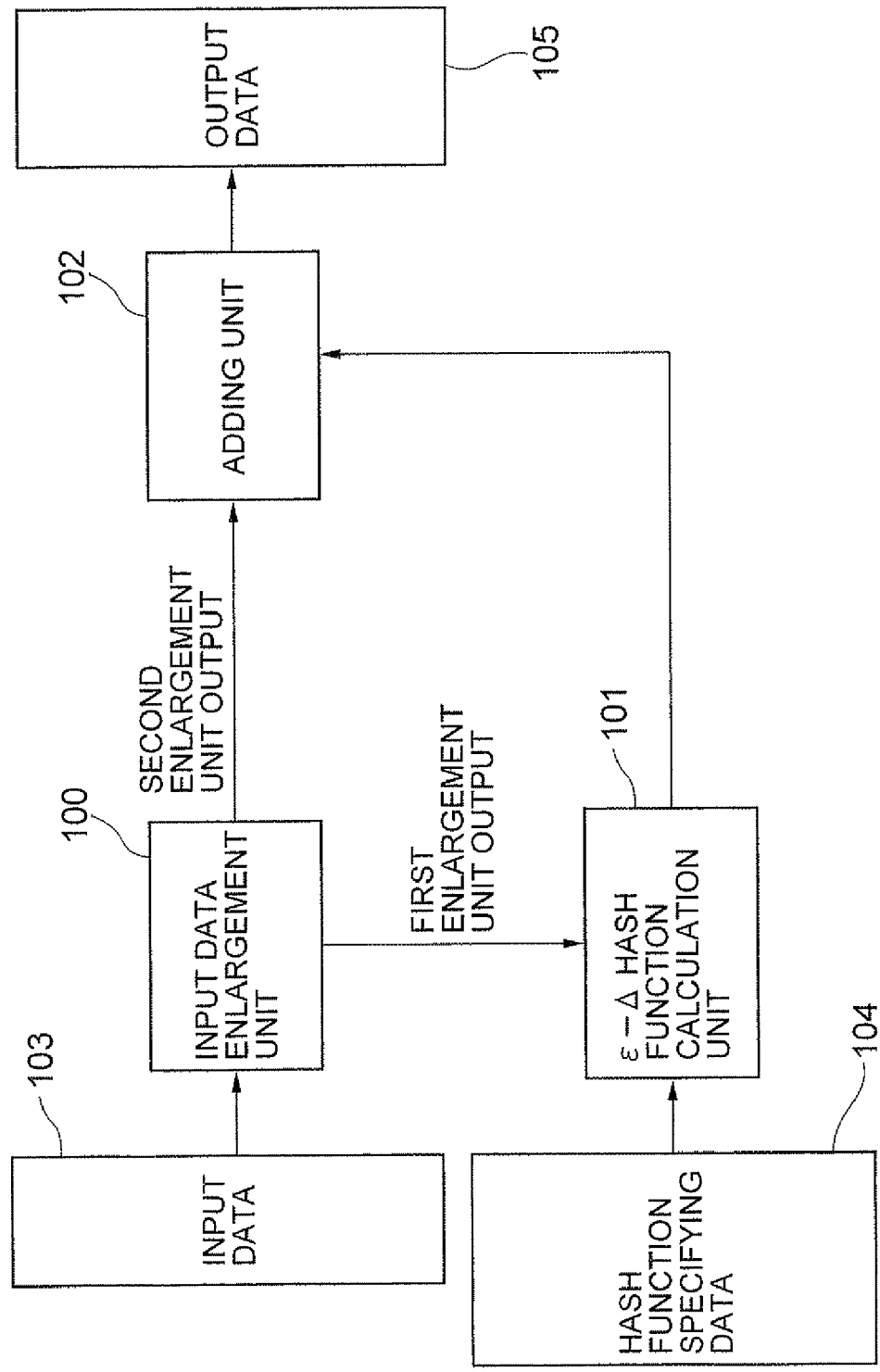
FIG. 1 is a block diagram showing a universal-hash-function-family calculation unit according to a first embodiment of the present invention.

FIG. 1 is a block diagram showing a universal-hash-function-family calculation unit according to a first embodiment of the present invention. As shown in FIG. 1, the universal-hash-function-family calculation unit according to the first embodiment includes an input-data enlargement unit 100 (input data enlarging means), an $\epsilon$-$\Delta$ hash-function calculation unit 110 ($\Delta$ hash function calculating means), and an adding unit 102 (adding means). To the universal-hash-function-family calculation unit according to the present embodiment, input data 103 which is an element of an input data set A and hash-function-specifying data 104 for specifying a hash function used in the $\epsilon$-$\Delta$ hash-function calculation unit 101 are input. The universal-hash-function-family calculation unit delivers output data 105. The output data 105 is configured by an output data set B satisfying $|A| \leq |B|^2$ and consists of a group of elements configuring output data set B.

The universal-hash-function-family calculation unit is an apparatus for realizing an $\epsilon$-universal-hash-function family. Accordingly, the input data set A is a set of input data for the $\epsilon$-universal-hash-function family, and output data set B is a set of output data of the $\epsilon$-universal-hash-function family.

To the input-data enlargement unit 100, the input data 103 which is configured by elements of input data set A is input. The input-data enlargement unit 100 delivers two output data as output data of the input-data enlargement unit 100 itself. Of the two output data that the input-data enlargement unit 100 delivers, output data delivered to the $\epsilon$-$\Delta$ hash-function calculation unit 101 is referred to as a first enlargement unit output. Further; of the two output data that the input-data enlargement unit 100 delivers, output data delivered to the adding unit 102 is referred to as a second enlargement unit output. The first and second enlargement unit outputs are both elements of the output data set B.

The input-data enlargement unit 100 suffices to derive the first and second enlargement unit outputs such that the following two conditions are satisfied and, any method can be used for deriving the first and second enlargement unit outputs so long as the following two conditions are satisfied. The first condition is that two output data (first and second enlargement unit outputs) resulting from the input of an element of the input data set A for the $\epsilon$-universal-hash-function family are both elements of the output data set B of the $\epsilon$-universal-hash-function family. The second condition is that the input-data enlargement unit 100 operates as a one-to-one function (mapping). That is, when different data is input as the input data 103 is to the input-data enlargement unit 100, the input-data enlargement unit 100 delivers different data. That is, output data (first and second enlargement unit outputs) resulting from the input of one input data to the input-data enlargement unit 100 and output data (first and second enlargement unit outputs) resulting from the input of another input data thereto differ from each other at any time.

To the $\epsilon$-$\Delta$ hash-function calculation unit 101 the first enlargement unit output and hash-function-specifying data 104 are input. The $\epsilon$-$\Delta$ hash-function calculation unit 101 receives, as an input, the first enlargement unit output, calculates a function $h\Delta$ which is an element of a function set $H\Delta$ and specified by the hash-function-specifying data 104, and delivers the calculation result (hash value of function $h\Delta$ resulting from the input of the first enlargement unit output) to the adding unit 102. The calculation result is an element of the data output set B. The function $h\Delta$ is an element of the function set $H\Delta$ having the following feature. That is, the function set $H\Delta$ has the feature that the number of ($h \in H\Delta$)s where $h(x) - h(y) = d$ is satisfied with respect to a given element d of the output data set B and given two different elements x,y of the output data set B is $|H\Delta| \cdot \epsilon$ or less. That is, the number of elements h of $H\Delta$ that satisfies $h(x) - h(y) = d$ is $|H\Delta| \cdot \epsilon$ or less. The $\epsilon$ is a constant representing the security level of the hash function and is previously determined based on the required security level. The output data set B is a domain set of $H\Delta$ and is a co-domain set of the domain set of $H\Delta$.

To the adding unit 102, the second enlargement unit output and calculation result of $\epsilon$-$\Delta$ hash-function calculation unit 101 are input. The adding unit 102 adds the input two data (second enlargement unit output and calculation result of $\epsilon$-$\Delta$ hash-function calculation unit 101) on the set B and delivers the addition result as the output data 105.

Operation will next be described.

Figure 2:
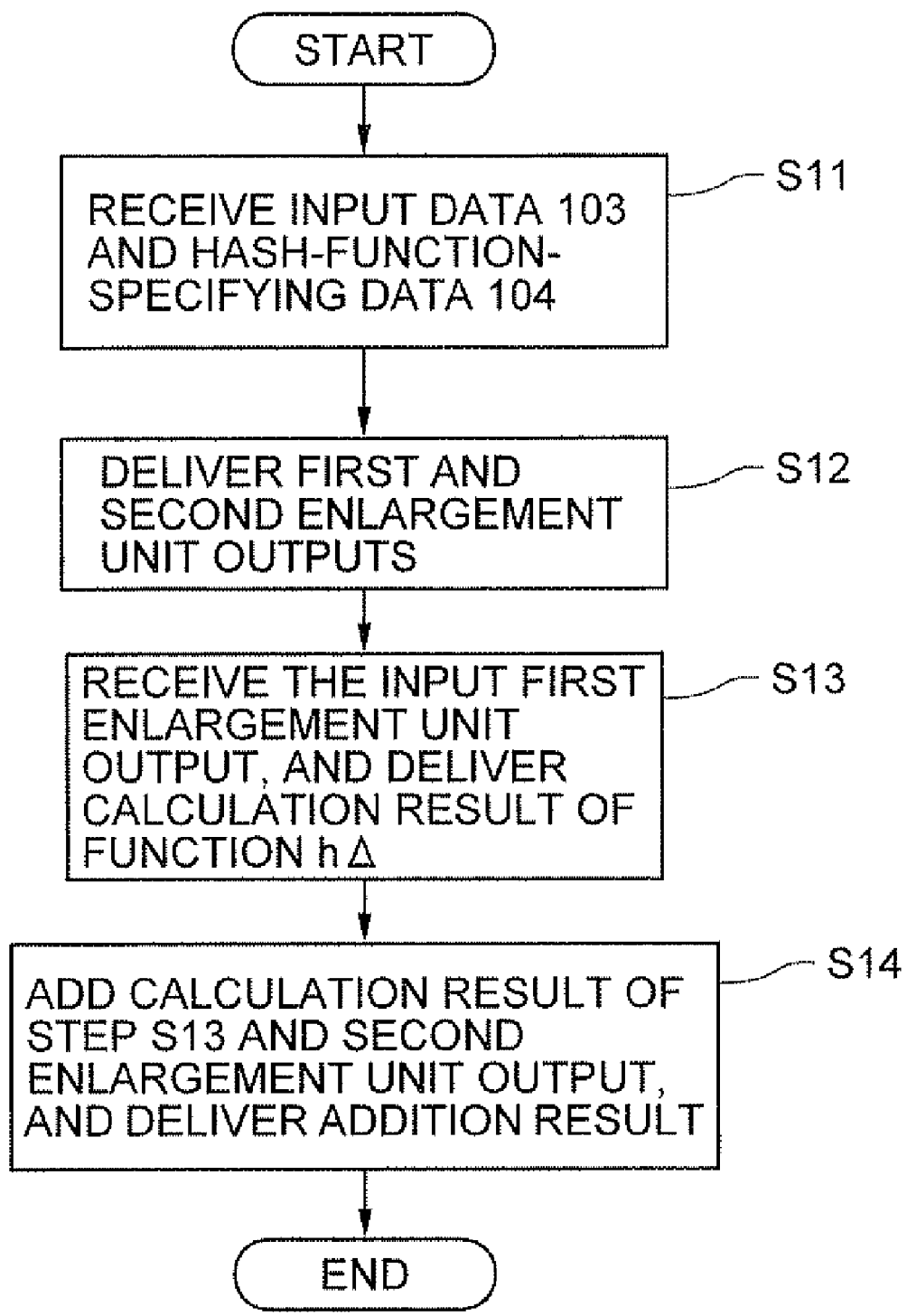
FIG. 2 is a flowchart showing an example of operation of the universal-hash-function-family calculation unit according to the first embodiment.

FIG. 2 is a flowchart showing an example of operation of the universal-hash-function-family calculation unit according to the present embodiment. First, the input data 103 is input to the input-data enlargement unit 100 and hash-function-specifying data 104 is input to the $\epsilon$-$\Delta$ hash-function calculation unit 101 (step S11). The input-data enlargement unit 100 derives the first and second enlargement unit outputs based on the input data 103 and delivers the first and second enlargement unit outputs to the $\epsilon$-$\Delta$ hash-function calculation unit 101 and adding unit 102, respectively (step S12). The $\epsilon$-$\Delta$ hash-function calculation unit 101 receives, as an input, the first enlargement unit output and calculates the function $h\Delta$ specified by the hash-function-specifying data 104 and delivers the calculation result to the adding unit 102 (step S13). The adding unit 102 adds the second enlargement unit output and calculation result of the $\epsilon$-$\Delta$ hash-function calculation unit 101 on the set B and delivers the addition result as the output data 105 (step S14).

An example in which the input-data enlargement unit 100 derives the first and second enlargement unit outputs in step S12 will be described below. It is assumed that n-bit data is input as the input data 103 to the input-data enlargement unit 100 and that the input-data enlargement unit 100 delivers m-bit data as the first and second enlargement unit outputs, where n≦2·m is satisfied. It is further assumed that the output data set is a set of m-bit data.

For example, in step S12, the input-data enlargement unit 100 delivers, as the first enlargement unit output, the higher m bits of n-bit input data 103 and delivers, as the second enlargement unit outputs the lower m bits thereof. Alternatively, the input-data enlargement unit 100 may output, as the first enlargement unit output, the lower m bits of n-bit input data 103 and delivers, as the second enlargement unit output, the higher m bits thereof. Hereinafter, such a derivation mode of the first and second enlargement unit outputs is referred to as a first derivation mode.

Further, in step S12, the input-data enlargement unit 100 may output, as the first enlargement unit output, the higher m bits of n-bit input data 103 and delivers, as the second enlargement unit output, the m bits obtained by connecting 0 of 2·m−n bits to the bit string from the (m+1)-th bit from the most significant bit of the input data 103 to n-th bit thereof. Alternatively, the input-data enlargement unit 100 may output, as the second enlargement unit output, the higher m bits of n-bit input data 103 and delivers, as the first enlargement unit output, m bits obtained by coupling a "0" bit train of 2·m−n bits to the bit string from the (m+1)-th bit from the most significant bit of the input data 103 to the n-th bit thereof. Hereinafter, such a derivation mode of the first and second enlargement unit outputs is referred to as a second derivation mode.

When the input-data enlargement unit 100 derives the first and second enlargement unit outputs in the first or second derivation mode, m-bit data is input as the hash-function-specifying data 104. Further in this case, the ϵ−Δ hash-function calculation unit 101 performs multiplication of the hash-function-specifying data 104, which includes m-bit data, and the first enlargement unit output on the Galois field GF(2m), and delivers the multiplication result to the adding unit 102. The adding unit 102 adds the calculation result of the ϵ−Δ hash-function calculation unit 101 and the second enlargement unit output, which is m-bit data, on the Galois field GF(2m) and delivers the addition result as the output data 105.

The first and second derivation modes described here are merely examples of operation of the input-data enlargement unit 100, and any method can be used to derive the first and second enlargement unit outputs so long as the first and second conditions described above are satisfied.

Although n-bit data is input as the input data 103 in the above first and second derivation modes, the representation of the data to be input as the input data 103 and representation of the data to be output as the output data 105 depend upon the design of the universal-hash-function-family calculation unit and are not specifically limited. For example, as shown in a first example to be described later, the input data 103 may be an element of the Galois field GF(q^n) represented by n-dimensional vector, and the output data 103 may be an element of the Galois field GF(q^m) represented by m-dimensional vector. Further, the representation of the hash-function-specifying data 104 is not specifically limited.

According to the present embodiment, by selecting, as the ϵ−Δ-hash-function set (abovementioned function set HΔ), a function set with a reduced number of elements, it is possible to realize an ϵ-universal-hash-function family having a reduced number of elements. Further, by selecting an ϵ−Δ hash-function set with the minimal number of elements, it is possible to minimize the number of elements of the ϵ-universal-hash-function family.

In the present embodiment, the input-data enlargement unit 100, ϵ−Δ hash-function calculation unit 101, and adding unit 102 may be configured by hardware having comparable functions. Alternatively, the input-data enlargement unit 100, ϵ−Δ hash function calculation unit 101, and adding unit 102 may be realized by a computer operating according to a universal-hash-function-family calculation program. In this case, for example, a computer reads the universal-hash-function-family calculation program stored in a storage unit and operates according to the universal-hash-function-family calculation program to thereby function as the input-data enlargement unit 100, ϵ−Δ hash function calculation unit 101, and adding unit 102.

Second Embodiment

Figure 3:
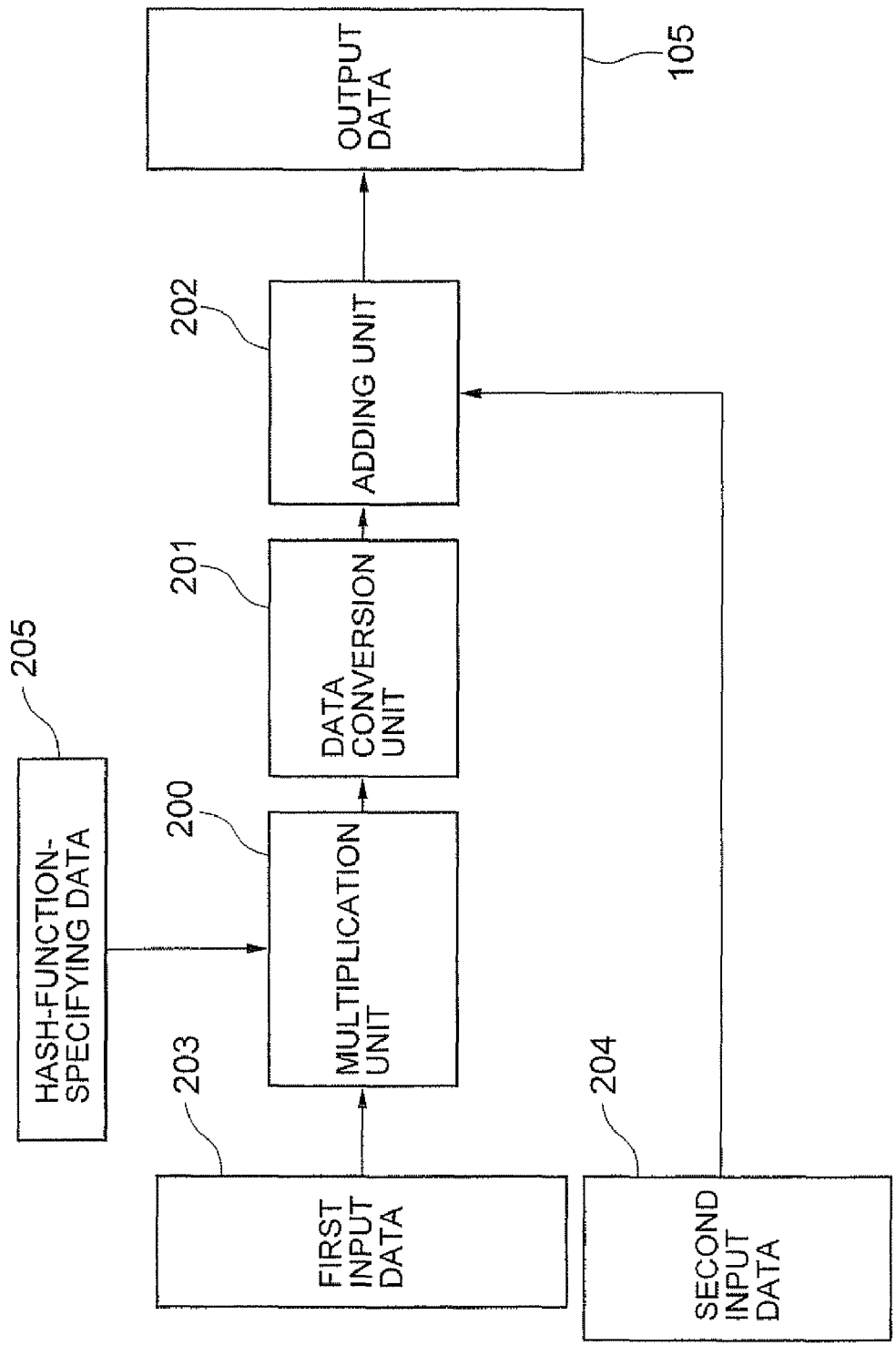
FIG. 3 is a block diagram showing a universal-hash-function-family calculation unit according to a second embodiment of the present invention.

FIG. 3 is a block diagram showing a universal-hash-function-family calculation unit according to a second embodiment of the present invention. As shown in FIG. 3, the universal-hash-function-family calculation unit according to the second embodiment includes a multiplication unit 200 (multiplying means), a data conversion unit 201 (data converting means) and an adding unit 202 (adding means). To the universal-hash-function-family calculation unit according to the present embodiment, first input data 203, second input data 204, and hash-function-specifying data 205 for specifying a hash function are input. The universal-hash-function-family calculation unit outputs output data 206 which is an element of output data set B consisting of a group of elements. In the present embodiment, the first input data 203 is an element of a set A (first set) which is a field where addition and multiplication can be defined. Further, the second input data 204 is an element of the output data set B (second set). Further, the hash-function-specifying data 205 is an element of the set A. In the present embodiment, a combination of the first and second input data 203 and 204 is an element of an input data set. Therefore, the number of elements of the input data set can be represented by |A|·|B|.

To the multiplication unit 200, the first input data 203 and hash-function-specifying data 205 are input. The multiplication unit 200 performs multiplication of the first input data 203 and hash-function-specifying data 205 on the field A and delivers the multiplication result to the data conversion unit.

The data conversion unit 201 is a unit for performing an onto-mapping which satisfies a linear characteristic. To the data conversion unit 201, the multiplication result of the multiplication unit 200 is input. The data conversion unit 201 converts the multiplication result into an element of the output data set B and delivers the conversion result to the adding unit 202. The conversion method used in the data conversion unit 201 is not specifically limited so long as the mapping is directed upward, satisfies the linear characteristic and the multiplication result of the multiplication unit 200 is converted into an element of the output data set B.

To the adding unit 202, the conversion result of the data conversion unit 201 and second input data 204 are input. The adding unit 202 adds the conversion result of the data conversion unit 201 and the second input data 204 on the set B and delivers the addition result as the output data 206.

Operation will next be described.

Figure 4:
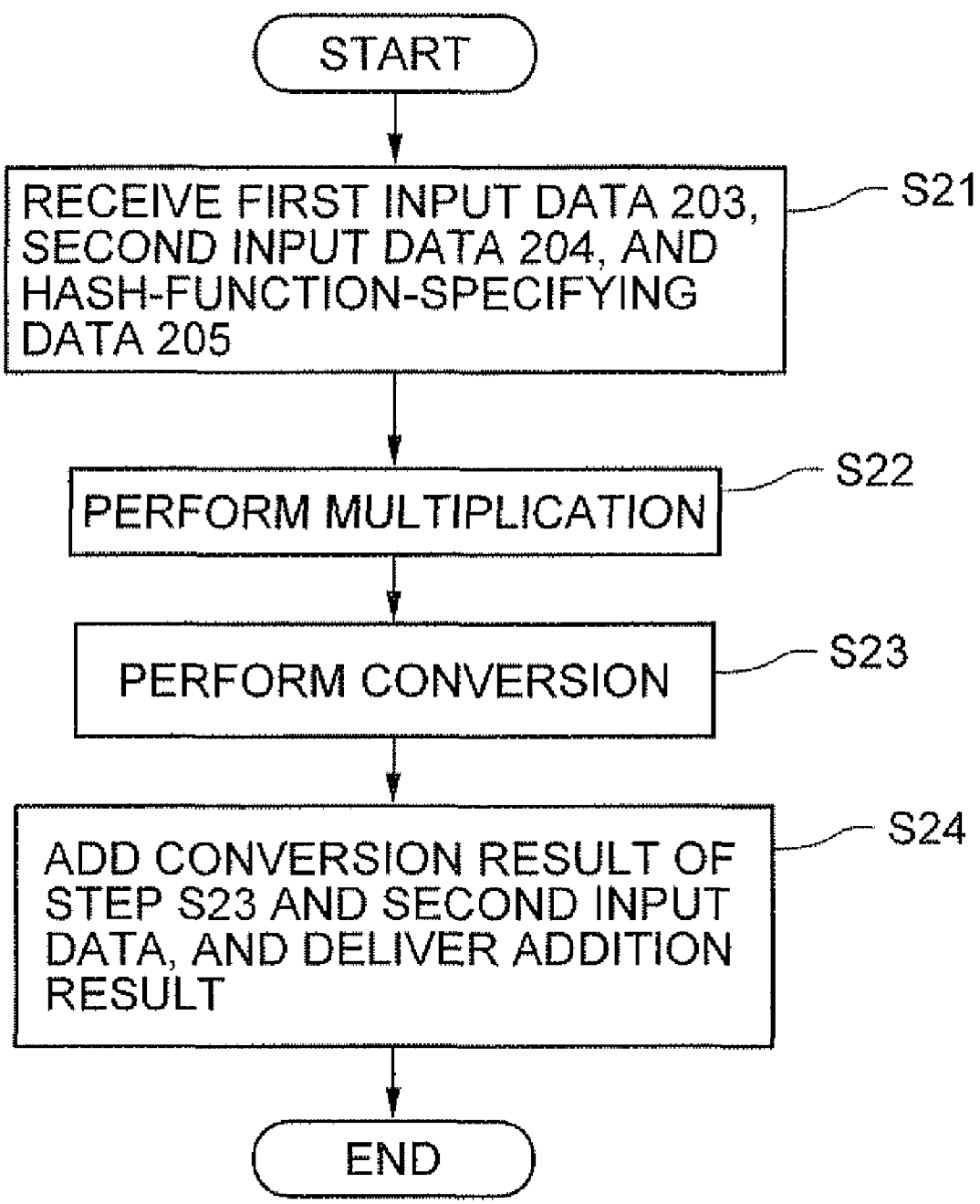
FIG. 4 is a flowchart showing an example of operation of the universal-hash-function-family calculation unit according to the second embodiment.

FIG. 4 is a flowchart showing an example of operation of the universal-hash-function-family calculation unit according to the present embodiment. Initially, the first input data 203 and hash-function-specifying data 205 are input to the multiplication unit 200, and then second input data 204 is input to the adding unit 202 (step S21). The multiplication unit 200 performs multiplication of the first input data 203 and hash-function-specifying data 205 on the field A and delivers the multiplication result to the data conversion unit (step S22). Thereafter, the data conversion unit 201 converts the multiplication result of step S22 into an element of the output data set B (step S23). The adding unit 202 adds the conversion result of step S23 and second input data 204 on the set B and delivers the addition result as the output data 206 (step S24).

The representation of the data to be input as the first input data 203 or second input data 204 and representation of the data to be output as the output data 206 depend upon the design of the universal-hash-function-family calculation unit and are not specifically limited. Similarly, the representation of the hash-function-specifying data 205 is not specifically limited.

According to the present embodiment, an $\epsilon$-universal-hash-function family where $\epsilon=1/|B|$ is satisfied, the number of elements of the input data set is $|A|\cdot|B|$, the number of elements of the output data set is $|B|$, and the number of elements of a function set is $|A|$ can be realized. Further, an $\epsilon$-universal-hash-function family where the number of elements assumes minimum can be realized.

In the present embodiment, the multiplication unit 200, data conversion unit 201, and adding unit 202 may be configured by hardware having comparable functions. Alternatively, the multiplication unit 200, data conversion unit 201, and adding unit 202 may be realized by a computer operating according to a universal-hash-function-family calculation program. In this case, for example, a computer reads the universal-hash-function-family calculation program stored in a storage unit and operates according to the universal-hash-function-family calculation program to thereby function as the multiplication unit 200, data conversion unit 201, and adding unit 202.

Third Embodiment

Figure 5:
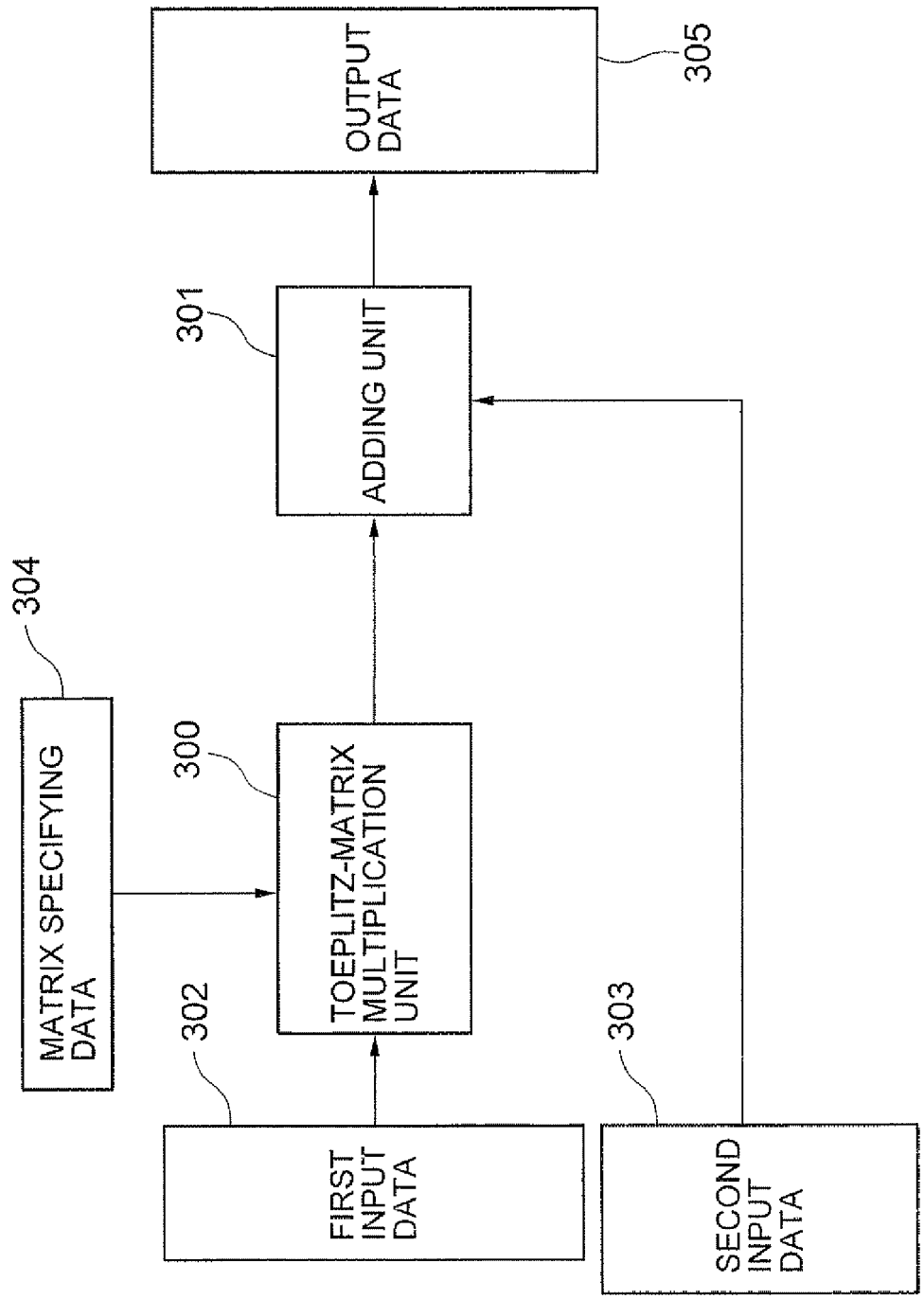
FIG. 5 is a block diagram showing a universal-hash-function-family calculation unit according to a third embodiment of the present invention.

FIG. 5 is a block diagram showing a universal-hash-function-family calculation unit according to a third embodiment of the present invention. As shown in FIG. 5, the universal-hash-function-family calculation unit according to the third embodiment includes a Toeplitz-matrix multiplication unit 300 (Toeplitz-matrix calculating means) and an adding unit 301 (adding means). To the universal-hash-function-family calculation unit according to the present embodiment, first input data 302, second input data 303, and matrix-specifying data 304 are input. The universal-hash-function-family calculation unit delivers output data 305.

The first input data 302 is an n-dimensional vector on a set A where scalar multiplication and addition can be defined. That is, the first input data 302 is a vector containing n elements of the set A. The second input data 303 is an m-dimensional vector on the set A. That is, the second input data 303 is a vector containing m elements of the set A. In the present embodiment, a combination of the first and second input data 302 and 303 is an element of an input data set.

The matrix-specifying data 304 is an (n+m−1)-dimensional vector on the set A that uniquely specifies a Toeplitz matrix which is an m-row and n-column matrix $A_{i,j}$ ($1 \leq i \leq m$, $1 \leq j \leq n$) that satisfies $A_{i,j}=A_{k,l}$ for given $i,j,k,l$ ($1 \leq i,k \leq m, 1 \leq j, 1 \leq n$) in which $k-i=l-j$ is satisfied. It is assumed here that the number of rows and number of columns of the Toeplitz matrix are m and n, respectively, and values of the m and n are fixed. When respective elements of a first row and respective elements of a first column are determined, the Toeplitz matrix can uniquely be determined. The matrix-specifying data 304 is an (n+m−1)-dimensional vector, and the respective elements of the first row and first column of the m-row and n-column matrix can be determined by (n+m−1) elements of the (n+m−1)-dimensional vector. Thus, the Toeplitz matrix can uniquely be determined by the matrix-specifying data 304.

For example, by determining in advance that the first to m-th elements of the input matrix-specifying data 304 ((n+m−1)-dimensional vector) are elements of the first row of the Toeplitz matrix and the (m+1)-th to (n+m−1)-th elements are elements obtained by removing an element of the first column from the elements of the first row of the Toeplitz matrix, the first row and first column of the Toeplitz matrix can be determined. In this case, the first element of the matrix-specifying data 304 is the element corresponding to the first row and first column of the Toeplitz matrix. As a result, the Toeplitz matrix can be determined.

The output data 305 is an m-dimensional vector on the set A.

To the Toeplitz-matrix multiplication unit 300, the first input data 302 and matrix-specifying data 304 are input. The Toeplitz-matrix multiplication unit 300 performs multiplication of the Toeplitz matrix (Toeplitz matrix uniquely determined by the matrix-specifying data 304) specified by the matrix-specifying data 304 and first input data 302. The Toeplitz-matrix multiplication unit 300 delivers an m-dimensional vector on the set A, which is the multiplication result, to the adding unit 301.

To the adding unit 301, the m-dimensional vector output from the Toeplitz-matrix multiplication unit 300 and second input data 303 which is an m-dimensional vector on the set A are input. The adding unit 301 adds together the two input data on the m-dimensional vector and delivers the addition result on the m-dimensional vector as the output data 305.

Operation will next be described.

FIG. 6 is a flowchart showing an example of operation of the universal-hash-function-family calculation unit according to the present embodiment. Initially, the first input data 302 and matrix-specifying data 304 are input to the Toeplitz-matrix multiplication unit 300, and second input data 303 is input to the adding unit 301 (step S31). The Toeplitz-matrix multiplication unit 300 performs multiplication of the Toeplitz matrix specified by the matrix-specifying data 304 and the first input data 302, and delivers the multiplication result to the adding unit 301 (step S32). The adding unit 301 adds the multiplication result of step S32 and the second input data 303 on the m-dimensional vector, and delivers the addition result as the output data 305.

According to the third embodiment, an $\epsilon$-universal-hash-function family can be realized where $\epsilon=1/|A|m$ is satisfied, the number of elements of the input data set is $|A|n+m$, the number of elements of the output data set is $|A|m$, and the number of elements of a function set is $|A|n+m-1$. Further, an $\epsilon$-universal-hash-function family where the number of elements is smaller than in the case of the method described in Non-Patent Document 1 can be realized.

A modification of the third embodiment will next be described.

In the third embodiment, the Toeplitz-matrix multiplication unit 300 performs multiplication of the Toeplitz matrix specified by the matrix-specifying data 304 and first input data 302. In an alternative, the configuration may be arranged such that the Toeplitz-matrix multiplication unit 300 determines the Toeplitz matrix according to the matrix-specifying data 304, then applies an elementary row transformation or elementary column transformation to the determined Toeplitz matrix, performs multiplication of the matrix that has been subjected to the elementary transformation and the first input data 302, and delivers the multiplication result to the adding unit 301. In this case, the adding unit 301 adds the multiplication result and second input data 303.

Examples of the elementary row transformation include the following: (1) exchanging the a-th row and both row of the matrix (in this example, Toeplitz matrix); (2) multiplying respective elements of the a-th row of the matrix (in this example, Toeplitz matrix) by c; and (3) adding values obtained by multiplying respective elements of the b-th row of the matrix (in this example, Toeplitz matrix) by c to the respective values of the a-th row thereof. The "c" may be an arbitrary value so long as it is an element of a set of the respective elements of the matrix and a $c \neq 0$ is satisfied. Further, "a" and "b" each may be an arbitrary natural number satisfying $1 \leq a \leq m$ or $1 \leq b \leq m$. The Toeplitz-matrix multiplication unit 300 applies one of the above three elementary transformations (elementary row transformations) to the Toeplitz matrix specified by the matrix-specifying data 304 and performs multiplication of the matrix after the elementary transformation and the first input data 302.

Examples of the elementary column transformation include the following: (1) exchanging the a-th column and b-th column of the matrix (in this example, Toeplitz matrix); (2) multiplying respective elements of the a-th column of the matrix (in this example, Toeplitz matrix) by c; and (3) adding values obtained by multiplying respective elements of the b-th column of the matrix (in this example, Toeplitz matrix) by c to the respective values of the a-th column thereof. The "c" may be an arbitrary value so long as it is an element of a set of the respective elements of the matrix and $c \neq 0$ is satisfied. Further, "a" and "b" each may be an arbitrary natural number satisfying $1 \leq a \leq n$ or $1 \leq b \leq n$. The Toeplitz-matrix multiplication unit 300 applies one of the above three elementary transformations (elementary column transformations) to the Toeplitz matrix specified by the matrix-specifying data 304 and performs multiplication of the matrix after the elementary transformation and the first input data 302.

An advantage t similar to that of the third embodiment can be obtained in the present modification.

Another modification of the third embodiment will next be described. In the third embodiment and aforementioned modification, the number of rows and number of columns of the Toeplitz matrix are m and n, respectively, which are fixed values. In an alternative, the configuration may be arranged such that the number of rows and number of columns are not fixed, and the Toeplitz-matrix multiplication unit 300 may determine the number of rows and number of columns in accordance with the input data.

In the present modification, in addition to the first input data 302 and matrix-specifying data 304, the number of rows and number of columns of the Toeplitz matrix are input to the Toeplitz-matrix multiplication unit 300. Assuming that the number of rows and columns input therein are m and n, respectively, an (n+m−1)-dimensional vector on the set A for which a scalar multiplication and addition can be defined is input as the matrix-specifying data 304. That is, the relationship r=n+m−1 is established among the number, m, of rows of the Toeplitz matrix, the number n of columns thereof and the number (r) of elements of the matrix-specifying data 304 which is a vector.

Further, an n-dimensional vector on the set A is input, as the first input data 302, to the Toeplitz-matrix multiplication unit 300, and an m-dimensional vector on the set A is input, as the second input data 303, to the adding unit 301.

Upon receiving the matrix-specifying data 304 and numbers m and n of rows and columns, the Toeplitz-matrix multiplication unit 300 determines e.g., that the first to m-th elements of the matrix-specifying data 304 (vector) are elements of the first row of the Toeplitz matrix and the (m+1)-th to (n+m−1)-th elements are elements obtained by removing an element of the first column from the elements of the first row of the Toeplitz matrix. In this case, the first element of the matrix-specifying data 304 is the element corresponding to the first row and first column of the Toeplitz matrix. As a result, the Toeplitz-matrix multiplication unit 300 can determine the first row and first column of the Toeplitz matrix. Based on the determined first row and first column, the Toeplitz-matrix multiplication unit 300 determines the Toeplitz matrix.

After determining the Toeplitz matrix according to the input matrix-specifying data 304 and the numbers m and n of rows and columns, the Toeplitz-matrix multiplication unit 300 performs multiplication of the Toeplitz matrix and the first input data 302. The adding unit 301 adds together the multiplication result and second input data 302, and delivers the addition result as the output data 305.

In an alternative, the configuration may be arranged such that after determining the Toeplitz matrix according to the input matrix-specifying data 304 and the numbers m and n of rows and columns, the Toeplitz-matrix multiplication unit 300 applies the elementary row transformation or elementary column transformation to the Toeplitz matrix, performs multiplication of the Toeplitz matrix after the elementary transformation and first input data 302, and delivers the multiplication result to the adding unit 301. Thereafter; the adding unit 301 adds together the multiplication result and the second input data 303.

The relationship r=n+m−1 is established among the number m of rows of the Toeplitz matrix, the number n of columns thereof, and the number r of elements of the matrix-specifying data 304 (vector). Thus, by feeding only one of the number of rows and number of columns after input of the matrix-specifying data 304, the other one can be derived.

For example, when the matrix-specifying data 304 and number of columns are input, the Toeplitz-matrix multiplication unit 300 uses the number r of elements of the matrix-specifying data 304 (vector) and number n of columns to derive the number in of rows according to the relationship m=r−n+1. Thus, in the present modification, the number of rows need not be input if the number of columns is input. In this case, the Toeplitz-matrix multiplication unit 300 derives the number m of rows from the number r of elements of the matrix-specifying data 304 and number n of columns.

Similarly, when the matrix-specifying data 304 and number of rows are input, the Toeplitz-matrix multiplication unit 300 uses the number r of elements of the matrix-specifying data 304 (vector) and number m of rows to derive the number n of columns according to the relationship n=r−m+1. Thus, in the present modification, the number of columns need not be input if the number of rows is input. In this case, the Toeplitz-matrix multiplication unit 300 derives the number n of columns from the number r of elements of the matrix-specifying data 304 and number m of rows.

As described above, in the present modification, both of or one of the numbers m and n of rows and columns of the Toeplitz matrix may be input to the Toeplitz-matrix multiplication unit 300.

An advantage similar to that of the third embodiment can be obtained in the present modification. Further, in this modification, the number of rows and number of columns of the Toeplitz matrix can be arbitrarily changed.

In the present embodiment, the Toeplitz-matrix multiplication unit 300 and adding unit 301 may be configured by hardware having comparable functions. Alternatively, the Toeplitz-matrix multiplication unit 300 and adding unit 301 may be realized by a computer operating according to a universal-hash-function-family calculation program. In this case, for example, a computer reads the universal-hash-function-family calculation program stored in a storage unit and operates according to the universal-hash-function-family calculation program to thereby function as the Toeplitz-matrix multiplication unit 300 and adding unit 301.

Example 1

A first example will next be described with reference to FIG. 1. The present example is an example corresponding to the first embodiment of the present invention. In the present example, n and m each are a natural number, and q is a prime number or integer obtained by raising a prime number.

In the present example, the input data 103 is an element of a Galois field $GF(q^n)$, and output data 105 is an element of a Galois field $GF(q^m)$ where $n \leq 2 \cdot m$ is satisfied. The Galois field $GF(q^n)$ corresponds to the input data set A in the first embodiment and Galois field $GF(q^m)$ corresponds to the output data set B in the first embodiment.

Assuming that an element of the Galois field $GF(q^n)$ is x, elements $x \in GF(q^n)$ can typically be represented by (x1, x2, ..., xn) by using n elements of Galois field $GF(q)=[0, 1, 2, 3, ..., q-1]$. Each xi ($0 \leq i \leq n$) is any value from 0 to q−1. The (x1, x2, ..., xn) is generally referred to as vector representation of elements x. The number of elements of the Galois field GF(q) is q and elements x of the Galois field $GF(q^n)$ is represented by an n-dimensional vector using the element of the Galois field GF(q). As a result, the number of elements (i.e., number of elements of the input data set) of the Galois field $GF(q^n)$ is $q^n$. The same is true in the element of the Galois field $GF(q^m)$. That is, the number of elements (i.e., number of elements of the output data set) of the Galois field $GF(q^m)$ is $q^m$.

Further, in the present example, it is assumed that a function set $H\Delta=[hk|h\#k(x)=k \times x, y \in GF(q^m)]$ where the number of functions is $q^m$ is used as an $\epsilon$-$\Delta$-hash-function $H\Delta$, and $k(k \in GF(q^m))$ which is an element of the Galois field $GF(q^m)$ is input as the hash-function-specifying data 104 for uniquely specifying the element of the hash function family.

To the input-data enlargement unit 100, an element of the elements x of the Galois field GF(q) represented by a vector (x1, x2, ..., xn) is input as the input data 103. The input-data enlargement unit 100 generates a first enlargement unit output (y1) and second enlargement unit output (y2) from the elements x. The y1 and y2 each are an element of the Galois field $GF(q^m)$ (i.e., y1,y2∈$GF(q^m)$) and can be represented by an m-dimensional vector. In the present example, the input-data enlargement unit 100 sets the element of $GF(q^m)$ represented by a vector consisting of m elements starting from the first to m-th elements of the elements x to y1. That is, the input-data enlargement unit 100 sets y1=(x1, x2, ..., xm). Further, the input-data enlargement unit 100 sets the element of $GF(q^m)$ represented by a vector obtained by coupling 2·m−n "0"s to the elements starting from the (m+1)-th to n-th elements of the elements x to y2. That is, the input-data enlargement unit 100 sets y2=(xm+1, xm+2, ..., xn, 0, 0, ..., 0). The input-data enlargement unit 100 delivers, as the first enlargement unit output, the y1=(x1, x2, ..., xm) to the $\epsilon$-$\Delta$ hash-function calculation unit 101 and delivers, as the second enlargement unit output, the y2=(xm+1, xm+2, ..., xn, 0, 0, ..., 0) to the adding unit 102.

In the present embodiment, an element of the elements x of the Galois field $GF(q^n)$ is input as the input data 103, and the input-data enlargement unit 100 delivers two elements y1, y2 of the Galois field $GF(q^m)$. Here the condition should satisfy that the representation of the two outputs is (x1, x2, ..., xm) and (xm+1, xm+2, ..., xn, 0, 0, ..., 0), assuming that the representation of the x to be input is (x1, x2, ..., xn). However the representations of x, y1, y2 and output data 105 are not specifically limited.

To the $\epsilon$-$\Delta$ hash-function calculation unit 101, the y1=(x1, x2, ..., xm) is input as the first enlargement unit output. Further, to the $\epsilon$-$\Delta$ hash-function calculation unit 101, the $k(k \in GF(q^m))$ which is an element of the Galois field $GF(q^m)$ is input as the hash-function-specifying data 104. The $\epsilon$-$\Delta$ hash-function calculation unit 101 multiplies y1 and k on the $GF(q^m)$ and delivers the multiplication result (y1×k) to the adding unit 102.

Details of the multiplication on the $GF(q^m)$ will be described. It is assumed that f(x) is an m-dimensional irreducible polynomial (nonfactorable m-dimensional polynomial) having an element on the GF(q) as a coefficient. At this time, assuming that the multiplication result of two elements a=(a1, a2, ..., am), b=(b1, b2, ..., bm) is c=(c1, c2, ..., cm), the ci($1 \leq i \leq m$) is represented by the following relationship.

$ci=(i-1)$-dimensional coefficient of $(a1+a2x+a3x2+...+amxm-1)(b1+b2x+b3x2+...+bmxm-1)$ mod $f(x)$.

The above multiplication on the $GF(q^m)$ is a known method.

To the adding unit 102, the y2=(xm+1, xm+2, ..., xn, 0, 0, ..., 0) which is the second enlargement unit output and the multiplication result y1×k of the $\epsilon$-$\Delta$ hash-function calculation unit 101 are input. The adding unit 102 adds together the y2 and y1×k on the $GF(q^m)$, and delivers the addition result as the output data 105.

Details of the addition on the $GF(q^m)$ will be described. When the addition of the two elements a=(a1, a2, ..., am), b=(b1, b2, ..., bm) of the $GF(q^m)$ is performed on the $GF(q^m)$, the addition of respective elements of the a and b are added on the GF(q), i.e., on the modulo. Thus, the vector representation of the addition result of the two elements a=(a1, a2, ..., am), b=(b1, b2, ..., bm) of the $GF(q^m)$ assumes (a1+b1 mod q, a2+b2 mod q, ..., am+bm mod q). The above addition on the $GF(q^m)$ is a known method.

In the present example, the number of elements of the input data set is $q^n$, the number of elements of the output data set is $q^m$, and the number of elements of the $\epsilon$-$\Delta$-hash-function family is $q^m$.

Example 2

A second example will next be described with reference to FIG. 3. The present example is an example corresponding to the second embodiment of the present invention. Here, as in the case of the first example, n and m each are a natural number, and q is a prime number.

In the present example, the first input data 203 is an element of the Galois field $GF(q^n)$, and the second input data 204 is an element of the Galois field $GF(q^m)$. The hash-function-specifying data 205 is an element of the Galois field $GF(q^n)$. The output data 206 is an element of the Galois field $GF(q^m)$. The first input data 203 and hash-function-specifying data 205 are each represented by an n-dimensional vector (or column) on the Galois field GF(q). The second input data 204 and output data 206 are each represented by an m-dimensional vector (or column) on the Galois field GF(q). However, in the present example, the representation of the hash-function-specifying data 205 is not specifically limited so long as the hash-function-specifying data 205 are elements of the GF(q). Further, the representations of the first input data 203, second input data 204, and output data 206 are not specifically limited.

The Galois field GE(q^n) corresponds to the set A described in the second embodiment. The Galois field GE(q^m) corresponds to the output data set B described in the second embodiment. Further, as described in the second embodiment, a combination of the first and second input data 203 and 204 is an element of the input data set. Thus, the number of elements of the input data set is a product of the number of elements of the Galois field GF(q^n) and that of the Galois field GF(q^m).

Further, in the present example, when an element y=(y1, y2, ..., yn) of the GF(q^n) is input, the data conversion unit 201 converts the y into an element of z=(z1, z2, ..., zm) of the GF(q^m) and delivers the z=(z1, z2, ..., zm).

In the present example, the first input data 203 and hash-function-specifying data 205 each configured by an element of the GF((q^n) are input to the multiplication unit 200. It is assumed here that the element of the GF(q^n) input as the first input data 203 is x1 and element of the GF(q^n) input as the hash-function-specifying data 205 is k. The multiplication unit 200 performs multiplication of the input two data x1 and k on the GF(q^n), and delivers the multiplication result to the data conversion unit 201. It is assumed here that the multiplication result is y and the y is represented by:

(y1,y2,...,yn), i.e., $y = x1 \times k = (y1, y2, ..., yn)$.

The multiplication result y=(y1, y2, ..., yn) is input to the data conversion unit 201. Then the data conversion unit 201 converts the multiplication result into an element of z=(z1, z2, ..., zm) of the GF(q^n), and delivers the element z=(z1, z2, ..., zm) to the adding unit 202.

The conversion result z of the data conversion unit 201 and second input data 204 (x2) are input to the adding unit 202. Then, the adding unit 202 adds together the z and x2 on the GF(q^m) and delivers the addition result z+x2 as the output data 206.

In the present example, the number of elements of the input data set is q^(n+m), the number of elements of the output data set is q^m, and the number of elements of the ε–Δ-hash-function family is q^n. The number of elements (q^n) of the ε–Δ-hash-function family is equal to a value obtained by diving the number of elements (q^(n+m)) of the input data set by the number of elements (q^m) of the output data set and, thus, it can be understood that an ε–Δ-hash-function family where the number of elements assumes a minimum is achieved in the present example.

Example 3

A third example will next be described with reference to FIG. 5. The present example is an example corresponding to the third embodiment of the present invention. Here, it is assumed that the number of rows and number of columns of the Toeplitz matrix are m and n, respectively, and values of the m and n are fixed.

In the present example, the first input data 302 is an n-dimensional vector (i.e., vector having n elements of the Galois field GF(q)) on the Galois field GF(q)). The second input data 303 is an m-dimensional vector (i.e., vector having m elements of the Galois field GF(q)) on the Galois field GF(q)). The output data 305 is an m-dimensional vector on the GF(q).

Further, in the present example, the matrix-specifying data 304 for specifying an m-row/n-column Toeplitz matrix on the GF(q) is defined by an (m+n−1)-dimensional vector:

$T = (t1,1, t2,1, t3,1, ..., tm,1, t1,2, t1,3, ..., t1,n)$ on the GF(q). The ti,j which is an element of the (m+n−1)-dimensional vector T represents an element located at i-th row and j-th column of the Toeplitz matrix. Thus, when the vector T is input, the Toeplitz-matrix multiplication unit 300 can determine respective elements configuring the first row and first column of the m-row/n-column matrix based on the number n+m−1 of elements of the vector T. Then, according to the nature of the Toeplitz matrix, when the respective elements configuring the first row and first column are determined, the Toeplitz-matrix multiplication unit 300 can uniquely determine the Toeplitz matrix.

The number of elements of the set of the first input data 302 (n-dimensional vector on the Galois field GF(q)) is q^n. The number of elements of the set of the second input data 303 (m-dimensional vector on the Galois field GF(q)) is q^m. A combination of the first and second input data is an element of the input data set, whereby the number of elements of the input data set is q^(n+m). The number of elements of the set of the matrix-specifying data 304 ((m+n−1)-dimensional vector on the GF(q)) for uniquely specifying the Toeplitz matrix, i.e., the number of elements of an ε-universal-hash-function family is q^(m+n−1).

The first input data 302 (x1) which is an n-dimensional vector on the GF(q) is input to the Toeplitz-matrix multiplication unit 300. Further, as the matrix-specifying data 304, the (m+n−1)-dimensional vector T on the GF(q) is input to the Toeplitz-matrix multiplication unit 300. The Toeplitz-matrix multiplication unit 300 determines m-row/n-column Toeplitz matrix (MT) based on the vector T. Then, the Toeplitz-matrix multiplication unit 300 performs multiplication of the Toeplitz matrix MT and x1 (first input data 302), and delivers the multiplication result MT·x1 to the adding unit 301.

The multiplication result MT·x1 of the Toeplitz-matrix multiplication unit 300 is input to the adding unit 301. Further, the second input data 303 (x2) which is an m-dimensional vector on the GF(q) is input to the adding unit 301. The adding unit 301 adds the input two data (MT·x1 and x2) on the m-dimensional vector on the GF(q), and delivers the addition result MT·x1+x2 as the output data 305.

In the present example, the number of elements of the input data set is q^(n+m), the number of elements of the output data set is q^m, and the number of elements of the ε-universal-hash-function family is q^(n+m−1). The number of elements (q^(n+m−1)) of the ε-universal-hash-function family is smaller than that q^(n+m) of the input data set. Thus, it can be understood that an ε-universal-hash-function family where the number of elements is smaller than in the case of the method described in Non-Patent Document 1 can be achieved.

Example 4

In this forth example, a shared-key generation system using the universal-hash-function-family calculation unit according to the first embodiment will be described. FIG. 7 is a block diagram showing an example of the configuration of the shared-key generation system. The shared-key generation system shown in FIG. 7 realizes sharing of a secret key by using the universal-hash-function-family calculation units according to the first embodiment provided in both transmitting device and receiving device and a quantum communication path. The quantum communication path used in the present example utilizes a single photon for one-bit information transmission. When information is intercepted by a third party on the quantum communication path, it is possible to detect a fact that the electronic interception has been made and the amount of intercepted information by comparing information of both transmitter and receiver.

In the present example, the shared-key generation system includes, on the transmitting device (device used by a sender) side, a random number generator 400, a first quantum communication device 401, a first computer 402, a first storage unit 403, and a first universal-hash-function computer 420. The first storage unit 403 stores an error correction program (first error correction program 408) for correcting an error occurring on the quantum communication path. The first computer 402 reads the first error correction program 408 and executes an error correction processing according to the first error correction program 408.

Further, in the present example, the shared-key generation system includes, on the receiving device (device used by a recipient) side, a second quantum communication device 405, a second computer 406, a second storage unit 407, and a second universal-hash-function computer 430. The second storage unit 407 stores an error correction program (second error correction program 409) for correcting an error occurring on the quantum communication path. The second computer 406 reads the second error correction program 409 and executes an error correction processing according to the second error correction program 409.

The first and second universal hash function computers 420 and 430 both correspond to the universal-hash-function-family calculation units according to the first embodiment. The first universal hash function computer 420 includes a first input-data enlargement unit 421, a first $\epsilon$-$\Delta$-hash-function computer 423, and a first adding unit 425. The second universal hash function computer 430 includes a second input-data enlargement unit 431, a second $\epsilon$-$\Delta$-hash-function computer 433, and a second adding unit 435. The first and second input-data enlargement units 421 and 431 both correspond to the input-data enlargement unit 100 (see FIG. 1) described in the first embodiment. The first and second $\epsilon$-$\Delta$-hash-function computers 423 and 433 both correspond to the $\epsilon$-$\Delta$-hash-function calculation unit 101 (see FIG. 1) of the first embodiment. Further, the first and second adding units 425 and 435 both correspond to the adding unit 102 (see FIG. 1) of the first embodiment.

In the present example, n-bit data is input, as input data, to both the first and second input-data enlargement units 421 and 431. Further, the first and second input-data enlargement units 421 and 431 both output m-bit data as first enlargement unit output and second enlargement unit output. It is assumed here that a relationship $n \leq 2 \cdot m$ is established. In the present example, the first input-data enlargement unit 421 delivers, as the first enlargement unit output, the higher m bits of the input data (n-bit) to the first $\epsilon$-$\Delta$-hash-function computer 423. The first input-data enlargement unit 421 delivers, as the second enlargement unit output, the lower m bits of the input data (n-bit) to the first adding unit 425. Similarly, the second input-data enlargement unit 431 delivers, as the first enlargement unit output, the higher m bits of the input data (n-bit) to the second $\epsilon$-$\Delta$-hash-function computer 433. The second input-data enlargement unit 431 delivers, as the second enlargement unit output, the lower m bits of the input data (n-bit) to the second adding unit 435.

Further, in the present example, a function set H$\Delta$=[hk|h#k (x)=k×x,k∈GF(2m)] where the number of elements is 2 m is used as an $\epsilon$-$\Delta$-hash-function set H$\Delta$, and the k which is m-bit data is used as the hash-function-specifying data for uniquely specifying the element of the hash function family. Therefore, m-bit data is input, as the hash-function-specifying data, to both the first and second $\epsilon$-$\Delta$ hash-function computers 423 and 433.

In the present example, the random number generator 400 generates random-number data. In this example, the random number generator 400 delivers n-bit random-number data. The first and second quantum communication devices 401 and 405 are connected by the quantum communication path 404, and exchange information therebetween.

The first and second computers 402 and 406 are connected by a communication path 410 and exchange information therebetween. Further, the first and second computers 402 and 406 each execute error correction processing according to the error correction program. The first computer 402 inputs data to the first universal hash function computer 420 and stores, as a shared key, data output from the first universal hash function computer 420 in the first storage unit 403. Similarly, the second computer 406 inputs data to the second universal hash function computer 420 and stores, as a shared key, data output from the second universal hash function computer 420 in the second storage unit 407.

Operation will next be described.

Initially, the random number generator 400 delivers source information of a key shared between a sender and a recipient. The information output from the random number generator 400 is input to the first quantum communication device 401 and first computer 402.

The first computer 402 stores the information received from the random number generator 400 in the first storage unit 403.

The first quantum communication device 401 transmits the information received from the random number generator 400 to the second quantum communication device 405 through the quantum communication path 404. Upon reception of the information, the second quantum communication device 405 delivers the received information to the second computer 406. The second computer 406 stores the information in the second storage unit 407.

It is highly likely that the output information of the random is number generator stored in the transmitting side storage unit (first storage unit 403) and information transmitted through the quantum communication path 404 and stored in the receiving side storage unit (second storage unit 407) do not coincide with each other due to occurrence of an error on the quantum communication path and electronic interception by a third pt. In order to make the two data (information stored in the first storage unit 403 and information stored in the second storage unit 407) coincide with each other, the sender instructs the first computer 402 to execute processing according to the first error correction program 408. Further, the sender instructs the second computer 406 to execute processing according to the second error correction program 409. As a result, the first computer 402 executes an error correction processing according to the first error correction program 408, and second computer 406 executes an error correction processing according to the second error correction program 409. The first and second computers 402 and 406 generate the same data having an n-bit length in the error correction processing. At this time, even if the output information of the random number generator stored in the first storage unit 403 and information transmitted through the quantum communication path 404 and stored in the second storage unit 407 are not the same, the first and second computers 402 and 406 generate the same data having an n-bit length in the error correction processing. The first computer 402 stores the n-bit data in the first storage unit 403. Similarly, the second computer 406 stores the n-bit data in the second storage unit 407.

The error correction processing performed by the first and second computers 402 and 406 will be described in more detail below. The random number generator 400 generates n-bit random-number data, whereby the first and second computers 402 and 406 each correct an error caused due to the electronic interception and generate the same data having an n-bit length both on the transmitting side and receiving side. The n-bit data stored in both the transmission side and receiving side before the start of the error correction processing is referred to as "information sequence".

The first computer 402 divides the information sequence stored in the first storage unit 403 into a plurality of blocks and, similarly, the second computer 406 divides the information sequence stored in the second storage unit 407 into a plurality blocks. The size of each block thus divided is the same between the transmitting side and receiving side. The first computer 402 calculates the parity for each block obtained by the division and transmits the parity to the second computer 406 through the communication path 410 which is a classical communication path. The second computer 406 also calculates the parity for each block obtained by the division.

The second computer 406 compares the parity that the second computer 406 itself has calculated and parity received from the first computer 402 with each other. When detecting a block where the parities do not coincide with each other, the second computer 406 transmits to the first computer 402 the information identifying the block.

The first and second computers 402 and 406 further divide into a plurality of blocks the block having a parity which does not coincide with that of the corresponding block. Also in this case, the size of each block obtained by the division is the same between the transmitting side and the receiving side. The block having a parity which does not coincide with that of the corresponding block is a block in which an odd number of errors occur. In the case where an even number of errors have occurred, parities coincide with each other between the transmitting side and receiving side. After the further division of the block having a parity which does not coincide with that of the corresponding block, the first computer 402 calculates the parity for each block obtained by the division and transmits the parity to the second computer 406. The second computer 406 also further divides the block having a parity which does not coincide with that of the corresponding block and calculates the parity for each block obtained by the division. The second computer 406 compares the parity that the second computer 406 itself has calculated and the parity received from the first computer 402 with each other. When detecting a block where the parities do not coincide with each other, the second computer 406 transmits to the first computer 402 the information identifying the block having a parity which does not coincide with that of the corresponding block.

As described above, the first and second computers 402 and 406 repeat the processing including: dividing a block, comparing the parities for each block obtained by the division and, upon detecting a block having a parity which does not coincide with that of the corresponding block, further dividing the block. The first and second computers 402 and 406 perform the repetitive processings until they can identify the location at which an error has occurred. After identifying the location of an error, the second computer 406 corrects the error.

After completion of the above-described error correction, the first and second computers 402 and 406 change the bit order of the information sequence and perform the same processing (repeating the division of the block so as to identify the location of an error and correcting the error after identification of the error location) as the above-described error correction. The first and second computers 402 and 406 repeat the error correction until the parities of all the blocks obtained by the division coincide with each other. The bit order is changed in the same manner between the transmitting side and receiving side.

Even if the parities of the block coincide with each other between the transmission side and the receiving side, there remains a is possibility that an even number of errors are included in the block. Thus, the first and second computers 402 and 406 change the bit order of the information sequence as described above and perform a processing (repeating the division of the block so as to identify the location of an error and correcting the error after identification of the error location) similar to the above-described error correction. If a case where the error correction need not be performed due to coincidence of the parities continues a predetermined number of times resulting from the change of the bit order, the first and second computers 402 and 406 end the processing of changing the bit order of the information sequence. Thereafter, the first computer 402 stores n-bit data having an order changed at that time in the first storage unit 403, and the second computer 406 stores the n-bit data in the second storage unit 407. With this processing, the error correction is ended. The predetermined number of times is set in advance so as to sufficiently increase the possibility that an even number of errors are not detected.

Although use of the parity is exemplified in the above error correction, a Hamming Code may be used instead. Further, in consideration that the Hamming code is a weak code having a small block length, a strong correction code such as BCH code or LDPC code may be used in the above error correction.

In the case where the amount of the information exchanged between the first and second computers 402 and 406 is small in the above error correction, the information is difficult to intercept; however, the number of communication times (transmission times) increases. On the other hand, in the case where the amount of the information exchanged between the first computer 402 and the second computer 406 is large, the number of communication times (transmission times) decreases although the information is easy to intercept. In view of this, the amount of information exchanged between the transmitting side and the receiving side is set so as to balance the difficulty of the electronic interception and the number of communication times required.

As a result of the execution of the error correction according to the error correction program, the amount of information that has been intercepted by a third party is estimated. The estimation of the amount of the intercepted information will be described below. In the quantum communication path 404, the electronic interception succeeds with a ½ probability and fails with a ½ probability. When the electronic interception has failed, the information being transmitted on the quantum communication path 404 is changed into different information. Thus, when the output information of the random number generator stored in the first storage unit 403 and the information transmitted through the quantum communication path 404 and stored in the second storage unit 407 are compared against each other, it is possible to estimate the amount of the information for which the electronic interception has failed from the number of bits having a value which does not coincide between the two information. As a result, it can be estimated that the electronic interception of information has succeeded in an amount comparable to the amount of the information for which the electronic interception has failed.

The sender and recipient input shared data (the same n-bit data shared between the transmitting side and the receiving side) to the first and second universal hash function computers 420 and 430, respectively, according to the following procedure to thereby invalidate the information intercepted by a third party.

The random number generator 400 of the transmitting device receives an input operation by, e.g., a sender, and delivers m-bit data. This output data of the random number generator 400 is input to the first computer 402. The first computer 402 inputs, as the hash-function-specifying data, the output data (m-bit data) of the random number generator 400 to the first $\epsilon$-$\Delta$ hash-function computer 423. At the same time, the first computer 402 transmits the output data of the random number generator 400 to the second computer 406 through the communication path 410. Upon reception of the m-bit data, the second computer 406 inputs, as the hash-function-specifying data, the m-bit data to the second $\epsilon$-$\Delta$ hash-function calculation unit 433.

The first computer 402 reads the result (the same n-bit data between the transmitting side and the receiving side) of the error correction stored in the first storage unit 403 and inputs the same as the input data to the first input-data enlargement unit 421. The first input-data enlargement unit 421 generates the first enlargement unit output and second enlargement unit output (which are both m-bit data) from the input n-bit data and delivers the outputs. In the present example, the first input-data enlargement unit 421 delivers, as the first enlargement unit output, the higher m bits of the input n-bit data to the first $\epsilon$-$\Delta$-hash-function computer 423. Further, the first input-data enlargement unit 421 delivers, as the second enlargement unit output, the lower m bits of the input n-bit data to the first adding unit 425.

A similar operation is performed on the receiving device. That is, the second computer 406 reads the result (the same n-bit data between the transmitting side and the receiving side) of the error correction stored in the second storage unit 407 and inputs the same as input data to the second input-data enlargement unit 431. The second input-data enlargement unit 431 generates the first enlargement unit output and second enlargement unit output (which are both m-bit data) from the input n-bit data and delivers the outputs. The second input-data enlargement unit 431 delivers, as the first enlargement unit output, the higher m bits of the input n-bit data to the second $\epsilon$-$\Delta$-hash-function computer 433. Further, the second input-data enlargement unit 431 delivers, as the second enlargement unit output is the lower m bits of the input n-bit data to the second adding unit 435.

The first enlargement unit output of the first input-data enlargement unit 421 is input to the first $\epsilon$-$\Delta$-hash-function computer 423. The first $\epsilon$-$\Delta$-hash-function computer 423 performs multiplication of the first enlargement unit output and output data of the random number generator 400 that has previously been input on the GF(2m), and delivers the multiplication result.

Similarly, the first enlargement unit output of the second input-data enlargement unit 431 is input to the second $\epsilon$-$\Delta$-hash-function computer 433. The second $\epsilon$-$\Delta$-hash-function computer 433 performs multiplication of the first enlargement unit output and output data (data transmitted to the second computer 406 through the communication path 410 and input thereto from the second computer 406) of the random number generator 400 that has previously been input on the GF(2m), and delivers the multiplication result.

On the transmitting side, the second enlargement unit output of the first input-data enlargement unit 421 and multiplication result of the first $\epsilon$-$\Delta$-hash-function computer 423 are input to the first adding unit 425. The first adding unit 425 adds together the input two data on the GF(2m), and delivers the addition result.

Similarly, on the receiving side, the second enlargement unit output of the second input-data enlargement unit 431 and multiplication result of the second $\epsilon$-$\Delta$-hash-function computer 433 are input to the second adding unit 435. The second adding unit 435 adds together the two input data on the GF(2m), and delivers the addition result.

The addition results output by the first and second adding units 425 and 435 serve as a shared key shared between the transmitting side and the receiving side. The first computer 402 stores the addition result (shared key) output by the first adding unit 425 in the first storage unit 403. Similarly, on the receiving side, the second computer 406 stores the addition result (shared key) output by the second adding unit 435 in the second storage unit 107.

In the present example, a random-number generating means is realized by the random number generator 400. A transmitting side storage means is realized by the first storage unit 403. A first quantum communication means is realized by the first quantum communication device 401. A second quantum communication means is realized by the second quantum communication device 405. A receiving side storage means is realized by the second storage unit 407. A transmitting side error correction means is realized by the first computer 402 executing the error correction according to the first error correction program 408. A receiving side error correction means is realized by the second computer 406 executing the error correction according to the second error correction program 409. A transmitting-side input means and a second random-number data transmitting means are realized by the first computer 402. A receiving-side input means and a second random-number-data receiving means are realized by the second computer 406. Further, in the present example, the m-bit data output from the random number generator 400 corresponds to the second random-number data.

By calculating a shared key and sharing the shared key between the transmitting side and the receiving side as described in the present example, it is possible to make the information intercepted by a third party practically unuseful for estimation of the shared key.

Further, the advantage of the present invention that the number of elements of the hash function set can be reduced affords the following advantages especially in a quantum cryptographic communication. The first advantage is that cryptographic-key generation speed in the quantum cryptographic communication can be increased. Since the information transmitted on the quantum communication path 404 and m-bit random-number data input to the first and second $\epsilon$-$\Delta$-hash-function computers 423 and 433 should be ones that cannot be estimated by a third party, a genuine-random-number circuit needs to be used as the random number generator 400. The speed of the random number generation by the true random number circuit is at most several Mbps at present (September 2005). Thus, to obtain as many cryptographic key as possible from the genuine random number output with a limited generation speed is a major issue. In the shared-key generation system shown in FIG. 7, when the size of the random number required for the first and second $\epsilon$-$\Delta$-hash-function computers 423 and 433 is reduced, the amount of random numbers that can be used as the source information of a cryptographic key, resulting in an increase in the cryptographic key generation speed.

The second advantage is that processing load of the first and second computers can be reduced. When an enormous amount of traffic is generated while the first and second computers 402 and 406 execute the error correction program and a program for privacy amplification, the processing load thereof may become greater with the result that the first and second computers 402 and 406 are unable to perform respective processings. If the size of the random-number data required for the first and second ε–Δ-hash-function computers 423 and 433 is reduced, the amount of information supplied to the second a ε–Δ-hash-function computer 433 can be reduced, thereby reducing, the processing load of the first and second ε–Δ-hash-function computers 423 and 433.

The third advantage is that the key volume for cryptographic communication can be increased. Authentication is required for the communication performed through the communication path 410 in order to prevent "spoofing" and, typically, a cryptographic key that has previously been generated is used to perform mutual authentication. A larger amount of information transmitted through the communication path 410 increases the key volume consumed for authentication, with the result that the key volume for intended purpose, i.e., cryptographic communication is reduced. By reducing the size of the random-number data input to the first and second ε–Δ-hash-function computers 423 and 433, the amount of traffic on the communication path 410 can be reduced, thereby reducing the key volume for authentication while increasing the key volume for intended purpose, i.e., cryptographic communication.

Although the first derivation mode described in the first embodiment is applied in the fourth example, the derivation mode of the first enlargement unit output and second enlargement unit output may be another one. For example, the second derivation mode described in the first embodiment can be applied.

INDUSTRIAL APPLICABILITY

The present invention can be applied to privacy amplification in the case where quantum communication is used to realize a shared key system. Further, the present invention can be utilized as a component for realizing a message authentication code.

The invention claimed is:

1. A universal-hash-function-family calculation device for a communication system that performs calculation using input data and delivers output data, comprising:
    an input data enlargement unit for receiving the input data and deriving, from the input data through one-to-one mapping, two elements of an output data set which is a set of the output data;
    a Δ-hash-function calculation unit for receiving hash-function-specifying data that uniquely specifies a hash function from a hash function set, the hash function being an element of the hash function set, to calculate a hash value of the hash function specified by the hash-function-specifying data by using as an input one of the two elements of the output data set derived by the input data enlargement unit; and
    an adding unit for adding together the hash value calculated by the Δ-hash-function calculation unit and the other of the two elements of the output data set derived by the input data enlargement unit, to output a result of the addition as output data, wherein:
    the Δ-hash-function calculation unit calculates the hash value of a hash function belonging to a hash function set and specified by the hash-function-specifying data, the hash function set satisfying a condition that a number of elements h of the hash function set satisfying h(x)–h(y)=d is equal to or smaller than a value obtained by multiplying a number of hash functions, which are elements of the hash function set, by a predetermined value, given x and y being two different elements belonging to a codomain set of the hash function set, given d being an arbitrary element belonging to a codomain set of the hash function set.

2. The universal-hash-function-family calculation device according to claim 1, wherein:
    the output data set is a set of m-bit data;
    the input data is n-bit data;
    the hash-function-specifying data is m-bit data;
    a relationship $n \leq 2 \cdot m$ is established between the n and the m;
    the input data enlargement unit derives, as the two elements of the output data set, higher m bits of the input data and lower m bits of the input data; and
    the Δ-hash-function calculation unit performs multiplication of one of the two elements of the output data set derived by the input data enlargement unit and the hash-function-specifying data of m bits on a Galois field GF(2m), to obtain a result of the multiplication as the hash value.

3. The universal-hash-function-family calculation device according to claim 1, wherein:
    the output data set is a set of m-bit data;
    the input data is n-bit data;
    the hash-function-specifying data is m-bit data;
    a relationship $n \leq 2 \cdot m$ is established between the n and the m;
    the input data enlargement unit derives, as the two elements of the output data set, higher m bits of the input data and m-bit data obtained by connecting a bit train including 2·m−n bits of "0"s to a bit train from an (m+1)-th bit to an n-th bit as counted from a most significant bit of the input data; and
    the Δ-hash-function calculation unit performs multiplication of one of the two elements of the output data set derived by the input data enlargement unit and the hash-function-specifying data of m-bit on a Galois field GF(2m), to obtain a result of the multiplication as the hash value.

4. A shared-key generation system that includes the universal-hash-function-family calculation devices according to any one of claims 1 to 3 each in a transmitting device and in a receiving device and generates a shared key shared between the transmitting device and the receiving device, said system comprising:
    a random-number generation unit for generating random-number data;
    a transmitting-side storage unit for storing first random-number data generated by the random-number generation unit;
    a first quantum communication unit for transmitting the first random-number data through a quantum communication path;
    a second quantum communication unit for receiving the first random-number data from the first quantum communication unit through the quantum communication unit path;
    a receiving-side storage unit for storing the first random-number data that the second quantum communication unit has received;
    a transmitting-side and receiving-side error correction units for generating shared data shared between the transmitting device and the receiving device, the transmitting-side error correction unit performing an error correction processing based on the first random-number data stored in the transmitting-side storage unit, the receiving-side error correction unit performing error correction processing based on the first random-number data stored in the receiving-side storage unit;

a transmitting-side input unit for inputting the shared data generated by the transmitting-side error correction unit to the input data enlargement unit of the transmitting-side universal-hash-function-family calculation device and inputting, as hash-function-specifying data, second random number generated by the random-number generating unit to the $\Delta$-hash-function calculating unit of the transmitting-side universal-hash-function-family calculation device;

a second random-number data transmission unit for transmitting the second random-number data generated by the random-number generation unit through a communication path;

a second random-number-data reception unit for receiving the second random-number data from the second random-number data transmission unit through a communication path; and a receiving-side input unit for inputting the shared data generated by the receiving-side error correction unit to the input data enlargement unit of the receiving-side universal-hash-function-family calculation device and inputting, as the hash-function-specifying data, the second random-number data that the second random-number-data reception unit has received to $\Delta$-hash-function calculation unit of the receiving-side universal-hash-function-family calculation device, wherein:

the transmitting-side universal-hash-function-family calculation unit delivers, as the shared key, output data corresponding to the data input by the transmitting-side input unit, and the receiving-side universal-hash-function-family calculation unit delivers, as the shared key, output data corresponding to the data input by the receiving-side input unit.

5. A universal-hash-function-family calculating method for a communication system that performs calculation using input data and delivers output data, comprising the steps of:

receiving the input data;

receiving hash-function-specifying data that uniquely specifies a hash function from a hash function set, the hash function being an element of the hash function set;

deriving, from the input data through a one-to-one mapping, two elements of an output data set which is a set of the output data, to enlarge the input data;

calculating a hash value of the hash function specified by the hash-function-specifying data by using, as an input, one of the two elements of the output data set derived by the input data enlarging step;

adding together the hash value calculated by the hash function calculating step and the other of the two elements of the output data set derived by the input data enlarging step, to output a result of the addition as output data, wherein:

the hash function calculating step calculates the hash value of a hash function belonging to a hash function set and specified by the hash-function-specifying data, the hash function set satisfying a condition that a number of elements h of the hash function set satisfying $h(x)-h(y)=d$ is equal to or smaller than a value obtained by multiplying a number of hash functions, which are elements of the hash function set, by a predetermined value, given x and y being two different elements belonging to a codomain set of the hash function set, given d being an arbitrary element belonging to a codomain set of the hash function set.

6. A computer-readable medium storing a universal-hash-function-family calculation program for a communication system that allows a computer to perform calculation using input data and deliver output data, the program allowing the computer to execute the processings of:

receiving the input data;

receiving hash-function-specifying data that uniquely specifies a hash function which is an element of a hash function set;

deriving, from the input data through a one-to-one mapping, two elements of an output data set which is a set of the output data to enlarge the input data;

calculating the hash value of a hash function belonging to a hash function set and specified by the hash-function-specifying data, the hash function set satisfying a condition that a number of elements h of the hash function set satisfying $h(x)-h(y)=d$ is equal to or smaller than a value obtained by multiplying a number of hash functions, which are elements of the hash function set, by a predetermined value, given x and y being two different elements belonging to a codomain set of the hash function set, given d being an arbitrary element belonging to a codomain set of the hash function set; and adding together the hash value calculated by the $\Delta$-hash-function calculating processing and the other of the two elements of the output data set derived by the input data enlarging processing, to output a result of the addition as output data.

* * * * *